United States Patent [19]

Imaide et al.

[11] Patent Number: 5,299,015
[45] Date of Patent: Mar. 29, 1994

[54] IMAGE PICKUP APPARATUS AND METHOD AND SYSTEM FOR CONTROLLING THE EXPOSURE OF THE IMAGE PICKUP APPARATUS

[75] Inventors: Takuya Imaide, Yokohama; Toshiro Kinugasa, Hiratsuka; Naoki Yamamoto; Tomoyuki Kurashige, both of Yokohama; Hiroyuki Tarumizu, Kamakura, all of Japan

[73] Assignees: Hitachi, Ltd., Tokyo; Hitachi Video Engineering Inc., Yokahama, both of Japan

[21] Appl. No.: 500,501

[22] Filed: Mar. 28, 1990

[30] Foreign Application Priority Data

Mar. 29, 1989 [JP] Japan ................................. 1-75122
Aug. 23, 1989 [JP] Japan ................................. 1-214762

[51] Int. Cl.$^5$ ..................... H04N 5/238; H04N 5/30
[52] U.S. Cl. ..................................... 348/229; 348/364
[58] Field of Search ............... 358/228, 209, 213.19, 358/909, 213.13, 225, 906; 354/410, 446, 443; H04N 5/238, 5/30

[56] References Cited

U.S. PATENT DOCUMENTS

| | | | |
|---|---|---|---|
| 4,300,167 | 11/1980 | Miller et al. | 358/210 |
| 4,806,964 | 2/1989 | Tamada et al. | 354/452 |
| 4,835,617 | 5/1989 | Todaka et al. | 358/213.13 |
| 4,868,667 | 9/1989 | Tani et al. | 358/228 |
| 4,884,144 | 11/1989 | Jinnai et al. | 358/228 |
| 4,890,166 | 12/1989 | Kimura et al. | 358/228 |
| 4,959,727 | 9/1990 | Imaide et al. | 358/228 |
| 4,959,728 | 9/1990 | Takahashi et al. | 358/228 |
| 4,967,281 | 10/1990 | Takada | 358/229 |
| 4,972,266 | 11/1990 | Tani | 358/213.19 |
| 5,087,978 | 2/1992 | Hieda | 358/228 |

FOREIGN PATENT DOCUMENTS 0342708 11/1989 European Pat. Off. ...... H04N 5/238
0066579 4/1985 Japan ................................. 358/228

OTHER PUBLICATIONS

IEEE Trans. on Consumer Electronics, vol. CE-33, No. 3, Aug. 1987, pp. 249-254.
Kinugasa et al., "An Electronic Variable-Shutter System in Video Camera Use", I.E.E.E. Transactions on Consumer Electronics, vol. CE-33, No. 3, Aug. 1987, New York, U.S.A., pp. 249-254.
IEEE Transactions on Consumer Electronics, vol. CE-33, No. 3, Aug. 1987, pp. 249-254, entitled "An Electronic Variable-Shutter System in Video Camera Use", by Kinugasa et al.
Nikkei Microdevices Publication, Oct. 1987, pp. 63-64, entitled "Electronic Variable Shutter Effective for Example in Enhancing Moving Object Resolution".

Primary Examiner—James J. Groody
Assistant Examiner—Safet Metjahic
Attorney, Agent, or Firm—Antonelli, Terry, Stout & Kraus

[57] ABSTRACT

Disclosed are an image pickup apparatus and method and system for controlling the exposure of the image pickup apparatus. The image pickup apparatus includes a circuit for detecting a voltage corresponding to a current value of an iris, a circuit for generating a voltage corresponding to a desired iris value, a circuit for comparing the two voltages, and a circuit for controlling the iris based on the result of the comparison so as to keep the iris value at the desired value, in which the exposure start time of an image pick-up device is changed in an increment/decrement of one horizontal scanning period and/or in an increment/decrement of a period shorter than one horizontal scanning period to thereby make it possible to perform manual-iris mode automatic exposure control.

32 Claims, 31 Drawing Sheets

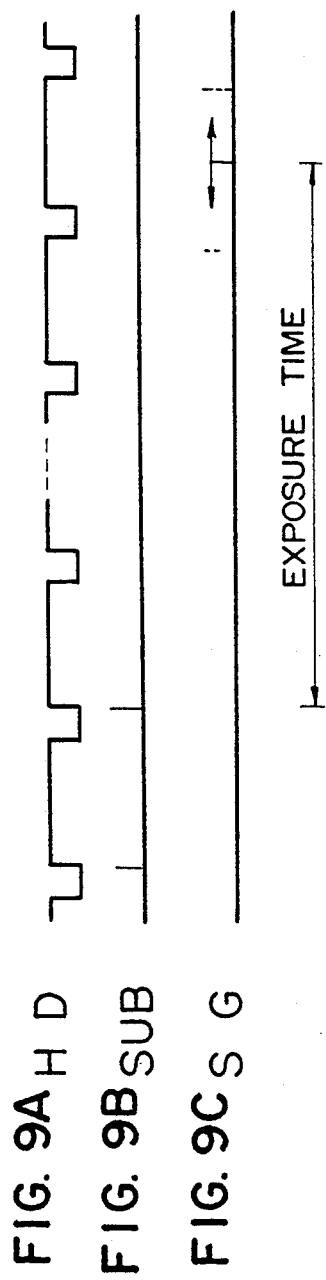
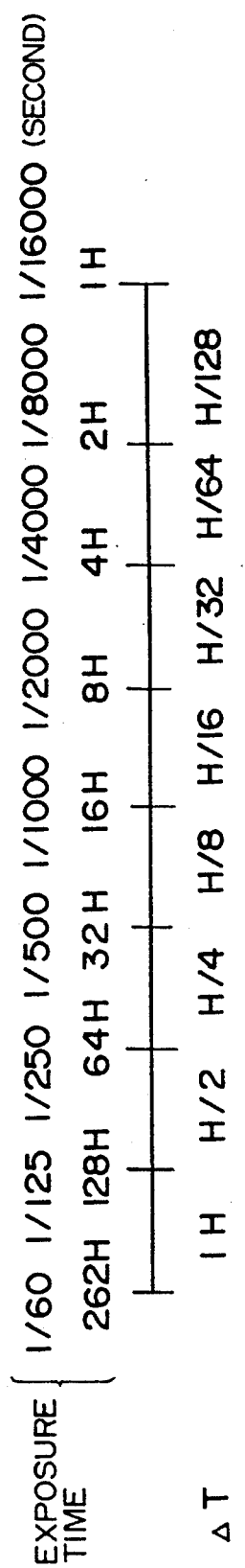
FIG. 9A HD
FIG. 9B SUB
FIG. 9C SG
FIG. 10

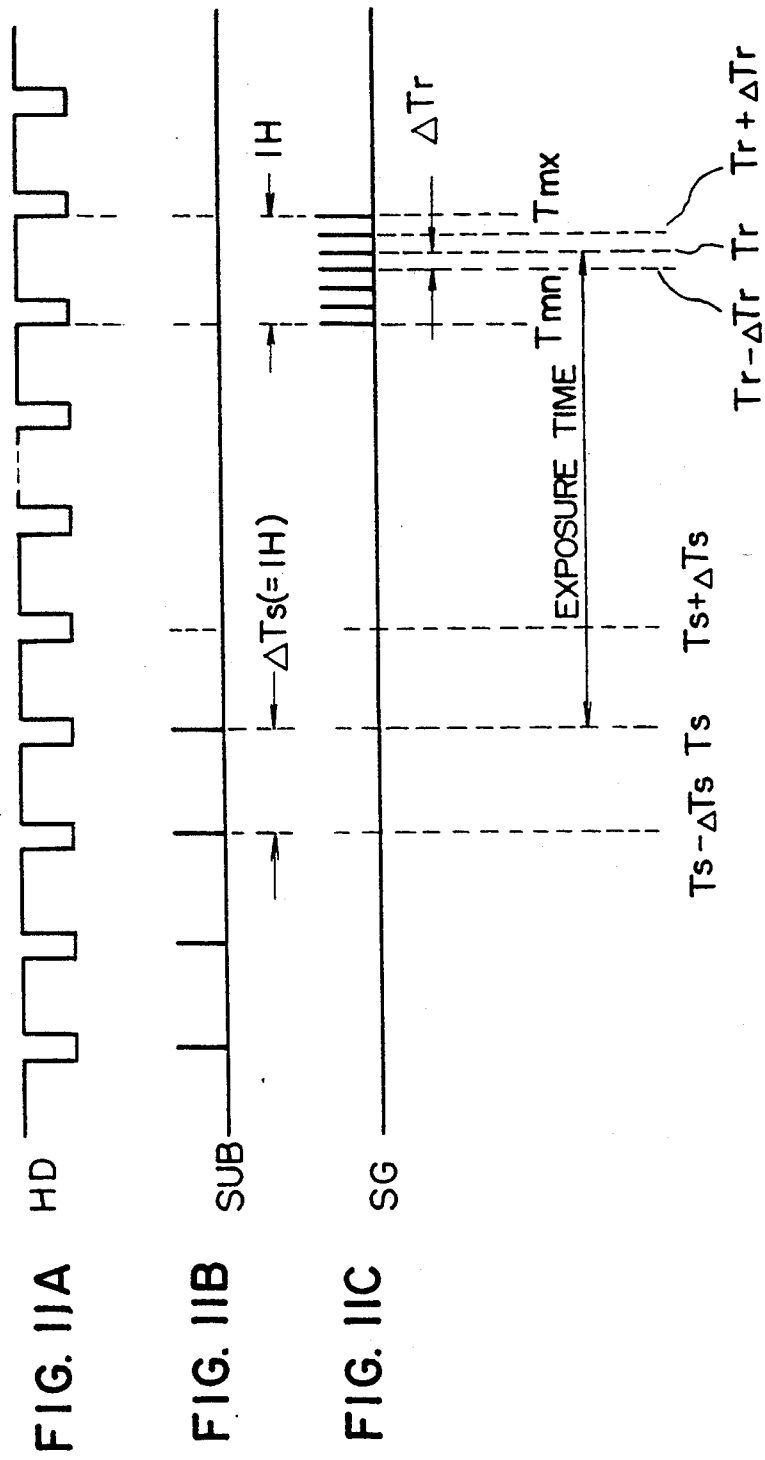

TARGET CHANGE OF IRIS VALUE

OUTPUT PULSE

ACTUAL CHANGE OF IRIS VALUE

T0  T1  T2 T3    T4    T5 T6

IMAGE PICKUP APPARATUS AND METHOD AND SYSTEM FOR CONTROLLING THE EXPOSURE OF THE IMAGE PICKUP APPARATUS

BACKGROUND OF THE INVENTION

The present invention relates to an image pickup apparatus and a method and a system for controlling the exposure of the image pickup apparatus. In particular, it relates to exposure control for use in an image pickup apparatus having an electronic variable shutter.

Recently, electronic variable shutters for electrically changing the exposure period of time of image pickup apparatus have been made available, and video movie cameras with a new exposure control system such as a programmed automatic exposure (AE) system or the like have been marketed. An electronic variable shutter used in a CCD image pickup apparatus is discussed in NIKKEI MICRODEVICE, No. 10, pp 63–64, October 1987. An electronic variable shutter with a programmed AE system used in an MOS image pickup apparatus is discussed in IEEE Transactions on Consumer Electronics, vol. CE-33, No. 3, pp 249-255, August 1987. A technique for shortening the exposure period of time less than a value designated by an operator when detecting an iris value larger than a predetermined value is disclosed in U.S. Pat. No. 4,959,727.

SUMMARY OF THE INVENTION

Conventional exposure control systems in video cameras (or video movie cameras) using the aforementioned electronic variable shutters are described with reference to FIGS. 1 and 2.

FIG. 1 is a circuit block diagram showing a conventional video camera having a manual-exposure time mode automatic exposure function (hereinafter automatic exposure function is called "AE function") in which the exposure period of time is manually set. When a user operates a control button 9, an exposure time changing circuit 10 constituted by a microcomputer or the like starts. As a result, the output pulse of an image pickup device drive circuit 11 changes so that the exposure period of time of an image pickup device 1 is fixed to a desired value. On the other hand, the output signal of the image pickup device 1 is amplified by an amplifier 2 and then supplied to a detector 4. The signal quantity is detected by the detector 4 which supplies a voltage corresponding to the signal quantity to a comparator 6. The comparator 6 compares the voltage corresponding to the signal quantity with a reference voltage supplied thereto from a constant voltage source 5 so as to control the iris of a lens 8 through an iris motor 7. According to the aforementioned construction, the iris can be controlled automatically in a suitable exposure period of time designated by a user, so that the output signal level of the amplifier 2 can be kept in a predetermined level, and, at the same time, the output signal level of a signal processing circuit 3 can be kept in a proper level.

FIG. 2 is a circuit block diagram showing another video camera which is constituted by adding a programmed AE function to the conventional video camera depicted in FIG. 1. In FIG. 2, same reference numerals as those used in FIG. 1 designate same as those parts in FIG. 1. In FIG. 2, reference numeral 12 designates an iris value detection circuit which is, for example, constituted by a position detecting element such as a Hall element disposed in the vicinity of the iris motor 7 and an amplifier so as to generate an output voltage corresponding to the iris value. When a programmed AE mode is selected by a user through operating a control button 13, an exposure time changing circuit 14 is given the programmed AE mode so that the exposure period of time is changed automatically corresponding to the iris value.

An example of the input-output characteristic of the iris value detecting circuit 12 is shown in FIG. 3. By using a position detection element such as a Hall element, the iris value can be converted into a voltage as described above.

An example of the relationship between the iris value and exposure period of time in the programmed AE mode is shown in FIG. 4. In this example, the exposure period of time is controlled as follows. When the quantity of incident light increases so that the iris value exceeds F4, the exposure period of time is automatically fixed to 1/120 sec. When the quantity of incident light increases further so that the iris value exceeds F5.6, the exposure period of time is automatically fixed to 1/250 sec. When the quantity of incident light, on the other hand, decreases so that the iris value is not more than F2.8, the exposure period of time is automatically returned to 1/120 sec. When the quantity of incident light decreases further so that the iris value is not more than F2, the exposure period of time is automatically returned to 1/60 sec. By the aforementioned control, the exposure period of time can be set to a value in a range of from 1/250 to 1/120 sec. in outdoor or in a well-lighted room for the purpose of recording a moving subject sharply. The problem of blur (hereinafter referred to as "iris related blur") due to a diffraction phenomenon occurring when intensive light enters a significantly closed iris can be eliminated because the iris in the exposure period of time of 1/120 to 1/250 sec. is open more widely by one to two stop value than the iris in the exposure period of time of 1/60 sec.

In the aforementioned conventional examples, the iris could not be fixed by the user, so that it was impossible to attain manual-iris mode AE for performing exposure control while changing the exposure period of time corresponding to the iris value designated by the user. Further, the problem of iris related blur could not be eliminated sufficiently. Due to this, there arises a problem in that the focus cannot be adjusted when intensive light enters the full frame.

It is therefore an object of the present invention to provide a method and a system for control exposure and an image pickup apparatus, in which manual-iris mode AE can be realized.

It is another object of the invention to provide a method and a system for control exposure and an image pickup apparatus, in which the problem of iris related blur due to diffraction can be eliminated perfectly.

To attain the first-mentioned object of the invention, in accordance with of an aspect of the present invention, a desired iris value is generated, a current iris value of an iris is detected, the detected current iris value is compared with the desired iris value, and the iris is controlled based on the result of the comparison so that the iris value is kept to the desired iris value.

It is preferable that the exposure period of time is selected successively in an increment/decrement finer than one horizontal scanning period (hereinafter referred to as "1H"). Accordingly, a conventional exposure time changing means capable of selecting charge sweep-out timing successively in an increment/decrement of 1H is used in combination with means for changing read-out timing finely over 1H is used to thereby make it possible to select the exposure period of time successively in an increment/decrement finer than 1H. Means for changing the gain of an amplifier within a predetermined range with respect to a well-lighted subject may be used as means equivalent to the means for changing read-out timing finely over a period of 1H.

To attain the second-mentioned object of the present invention, in accordance with another aspect of the present invention, the iris is limited so that the iris value does not exceed a predetermined value, and the exposure period of time and/or the amplification gain when the output signal amplified is controlled to thereby automatically adjust the level of the output signal of the image pickup device.

The iris control can be attained through the steps of: generating a desired iris value of an iris; detecting a current iris value; comparing the two values; changing the iris based on the result of the comparison; and limiting the desired iris value..

By setting and keeping the iris, a desired iris value can be selected by the user. Further, the level of the output signal of the image pickup device can be kept in a proper level by automatically controlling the controlled variables other than the iris, that is, by controlling the exposure period of time and/or the amplification gain of an amplifier for amplifying the output signal of the image pickup device.

When the exposure period of time is changed as an automatically controlled variable other than the iris, the deviation of the signal level from the desired set value can be reduced sufficiently because the control for changing the read-out timing finely over a period of 1H is used in addition to the conventional exposure time control for selecting the sweep-out timing successively at an increment/decrement of 1H.

Further, because an upper limit is provided in the iris, the iris cannot be reduced beyond the upper limit. According, iris related blur can be prevented. Further, the level of the output signal of the camera can be kept in a proper value by performing automatic control of such a control variable other than the iris as described above.

BRIEF DESCRIPTION OF THE DRAWINGS

Other features and advantages of the present invention will be apparent from the following description taken in connection with the accompanying drawings, wherein:

FIGS. 9A–9D are pulse waveform diagrams showing an image pickup device driving signal;

FIG. 10 is a timing chart showing increment/decrement amounts of exposure period of time;

FIGS. 11 through 13 are views for explaining control in the case where the embodiment in FIG. 8 is realized by use of a microcomputer;

DESCRIPTION OF THE PREFERRED EMBODIMENTS

Figure 1:
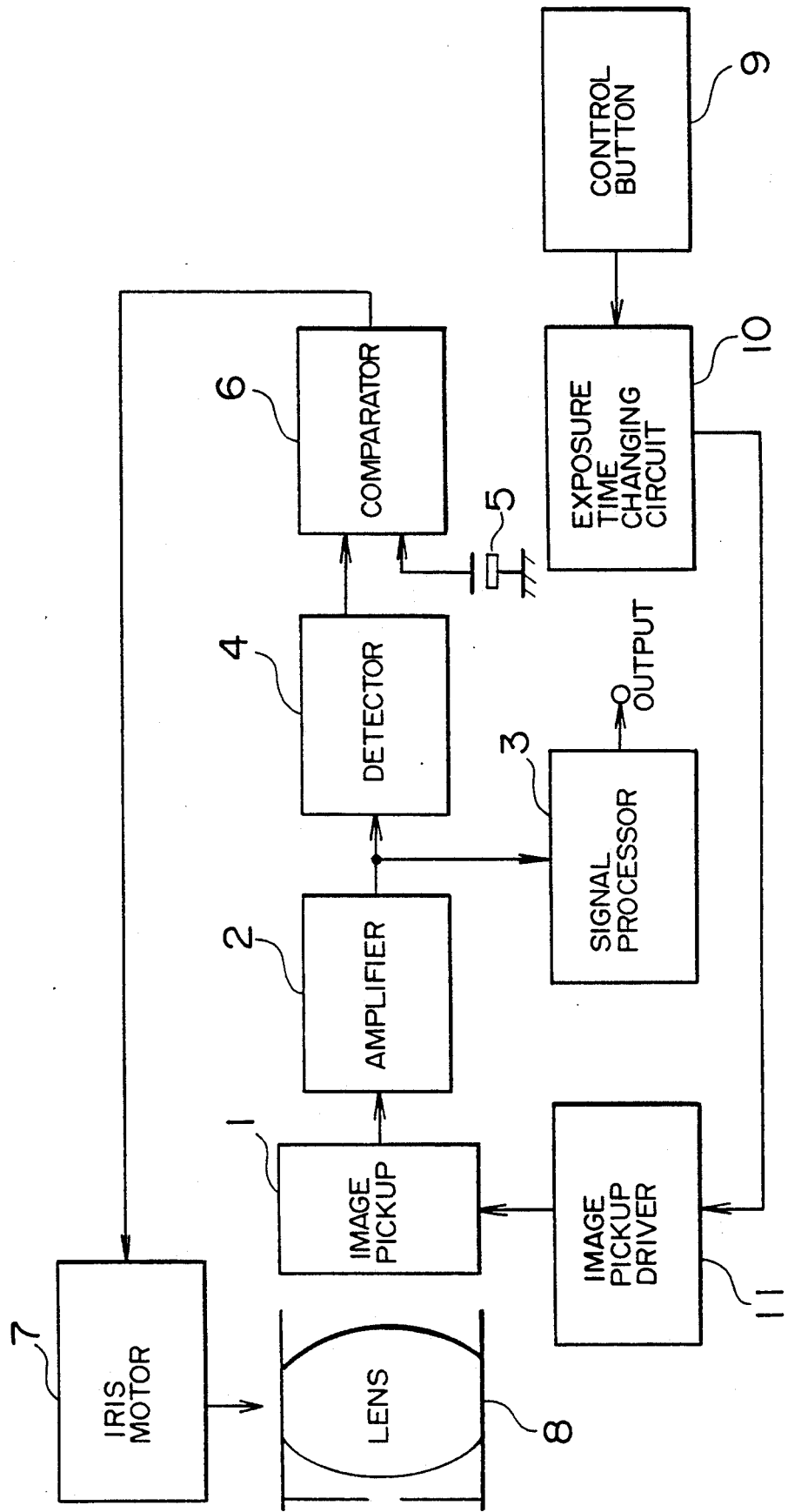
FIGS. 1 and 2 are block diagrams of conventional image pick-up apparatus (video cameras)
Figure 2:
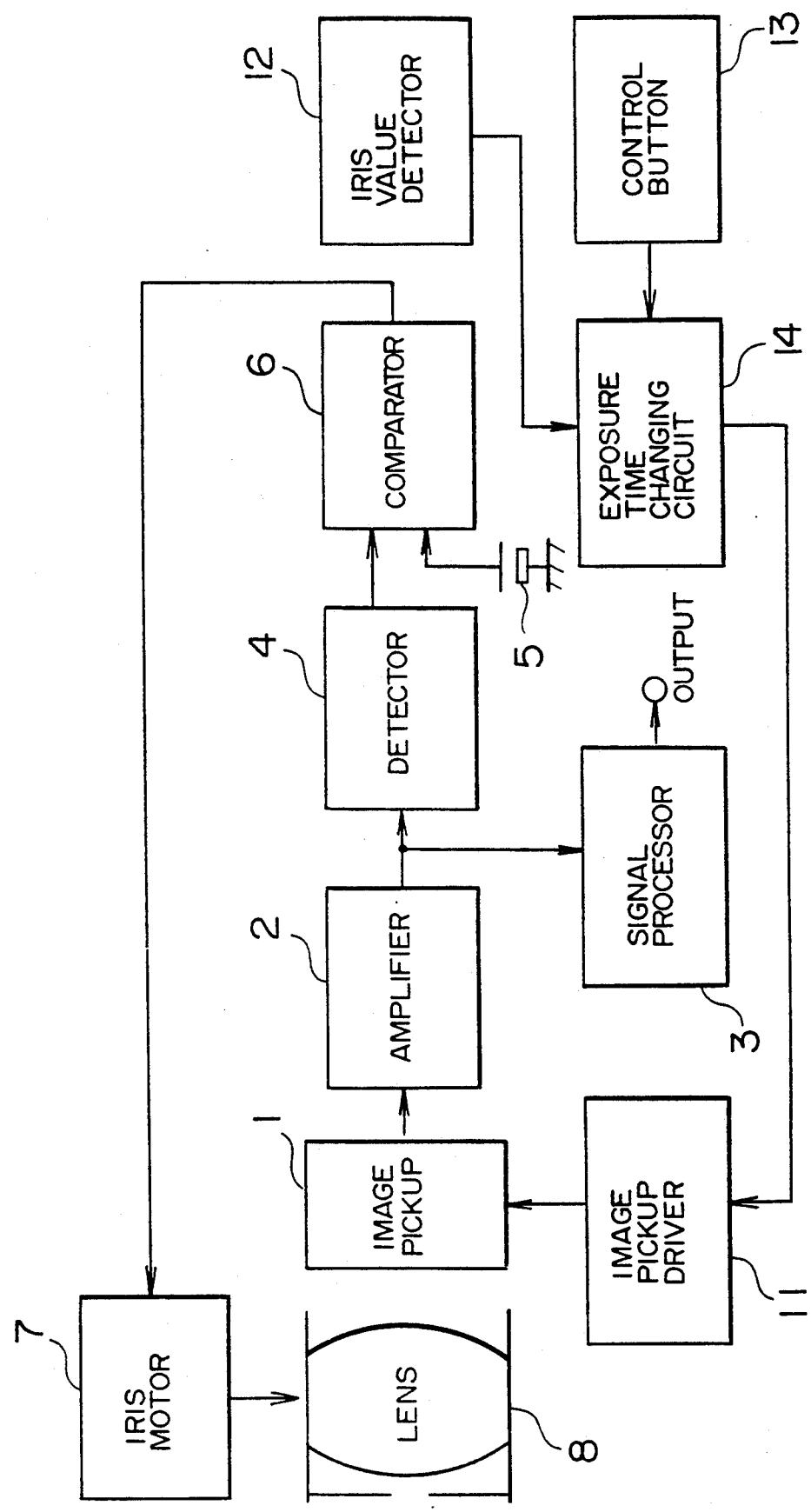
Figure 3:
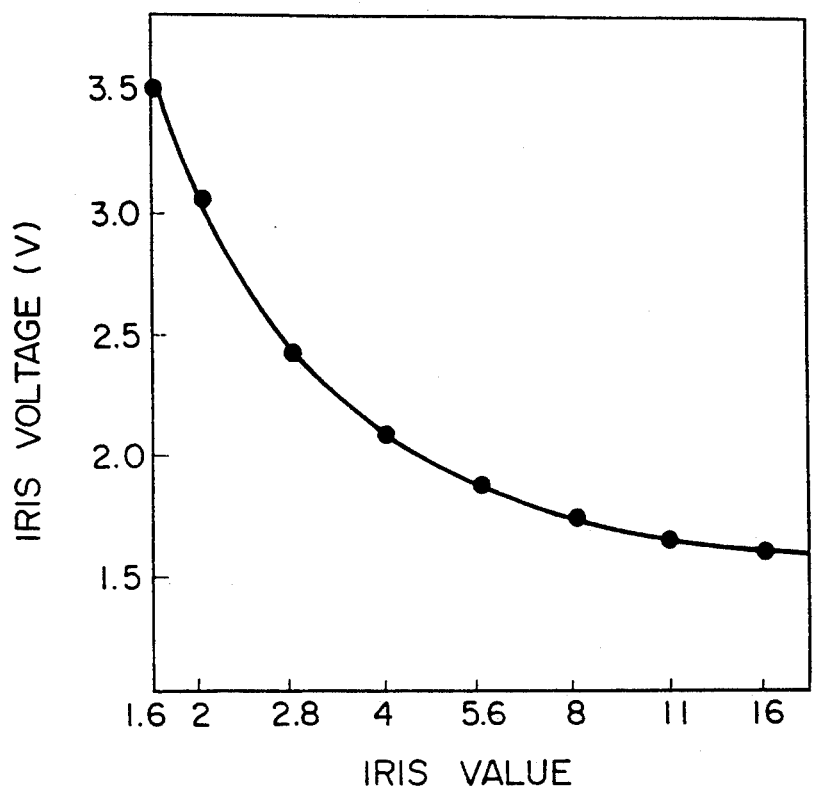
FIG. 3 is a graph showing an example of the input-output characteristic of an iris value detecting circuit.
Figure 5:
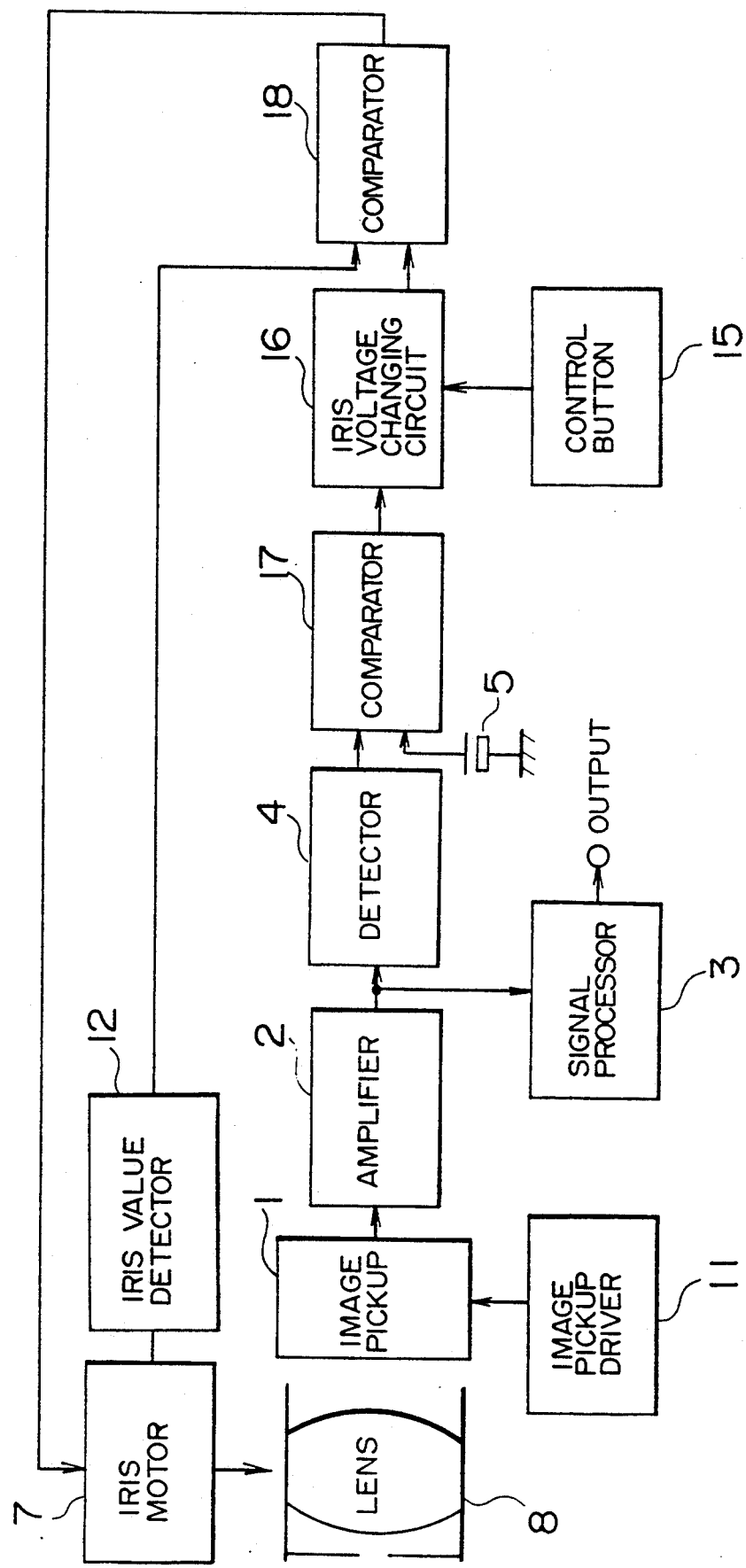
FIG. 5 is a block diagram of an image pickup apparatus as an embodiment of the present invention.

An embodiment of the present invention will be described hereunder with reference to FIG. 5. In this embodiment, the same reference numerals as those used in FIGS. 1 and 2 designate the same parts as in FIGS. 1 and 2. Referring to FIG. 5, this embodiment is an example in which means for setting an iris and maintaining the iris as set is provided in a camera in which automatic exposure control is performed by means of the iris. In FIG. 5, reference numeral 16 designates an iris voltage changing circuit for generating a desired iris voltage. The iris value detecting circuit 12 detects a current iris voltage, and a comparator 18 compares the current iris voltage from the iris value detecting circuit 12 and the desired iris voltage from the iris voltage changing circuit 16. The iris motor 7 is controlled on the basis of the result of comparison in the comparator 18 so that the iris value is set to the desired one. A control button 15 is arranged so as to be operated by a user and forms a part of a circuit for changing over the control mode between automatic iris control and manual iris control and for designating an iris value at the time of manual iris control. When the user selects manual iris control, an iris voltage corresponding to the iris value designated by the user is issued as a desired iris voltage from the iris voltage changing circuit 16. When the user selects automatic iris control, the output voltage of the iris voltage changing circuit 16 is changes automatically up or down based on the result of the comparison by means of a comparator 17 between the signal quantity from the detector 4 and the reference value from the constant voltage source 5 until the signal quantity from the detector 4 and the reference value from the constant voltage source 5 become substantially coincident with each other. According to the present invention, not only the iris value can be controlled automatically, but also it can be set in a desired iris value designated by the user.

Figure 6:
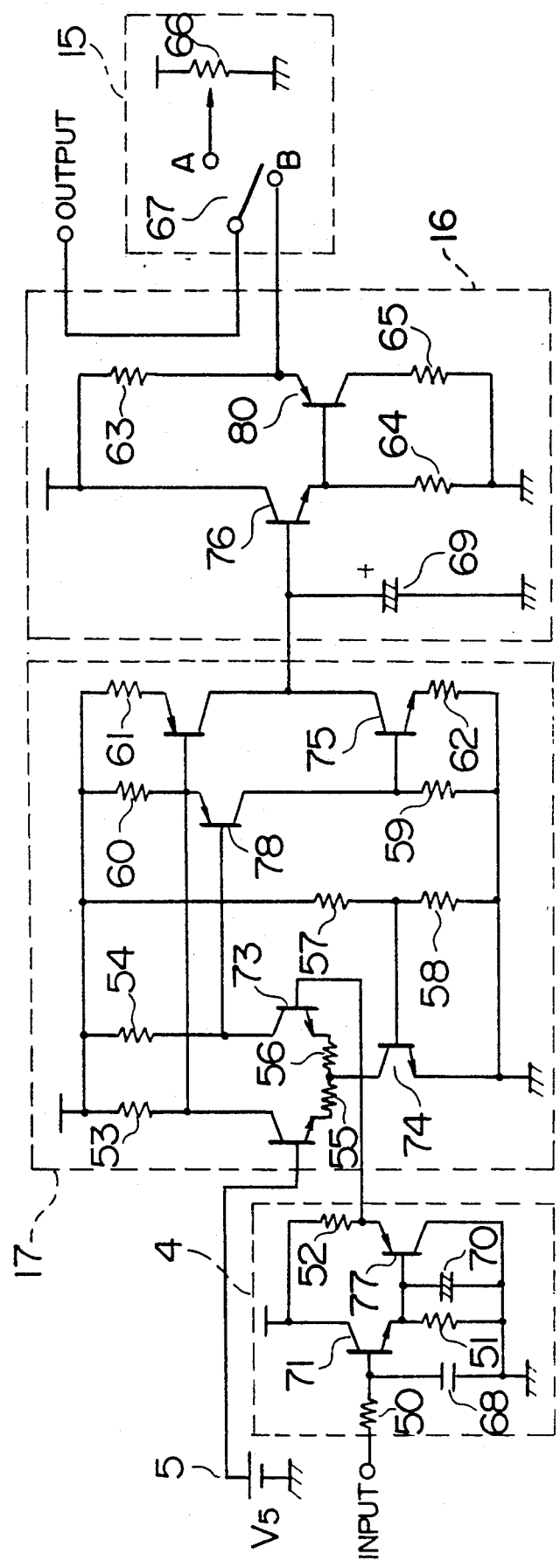
FIGS. 6 and 7 are diagrams showing examples of an important part of the image pickup apparatus depicted in FIG. 5 implemented in analog and digital circuits, respectively.

FIG. 6 is a detailed circuit diagram specifically showing the detector 4, comparator 17, the iris voltage changing circuit 16 and the control button 15 in the embodiment of FIG. 5. In FIG. 6, reference numerals 50 through 65 designate resistors, 66 designates a variable resistor, 67 designates a switch, 68 through 70 designate capacitors, 71 through 76 designate NPN transistors, and 77 through 80 designate PNP transistors. The automatic iris control and manual iris control are selected by turning the switch 67 to the sides B and A, respectively. A voltage V5 supplied from a constant voltage source 5 is used as the above-mentioned reference value for the signal quantity. When automatic iris control is selected, the signal quantity or output of the detector 4 is compared with the reference value and then a voltage corresponding to the result of the comparison is issued from the iris voltage changing circuit 16. When manual iris control is selected, a desired iris value is set through the variable resistor 66 and then the set iris value is outputted from the iris voltage changing circuit 16.

Figure 7:
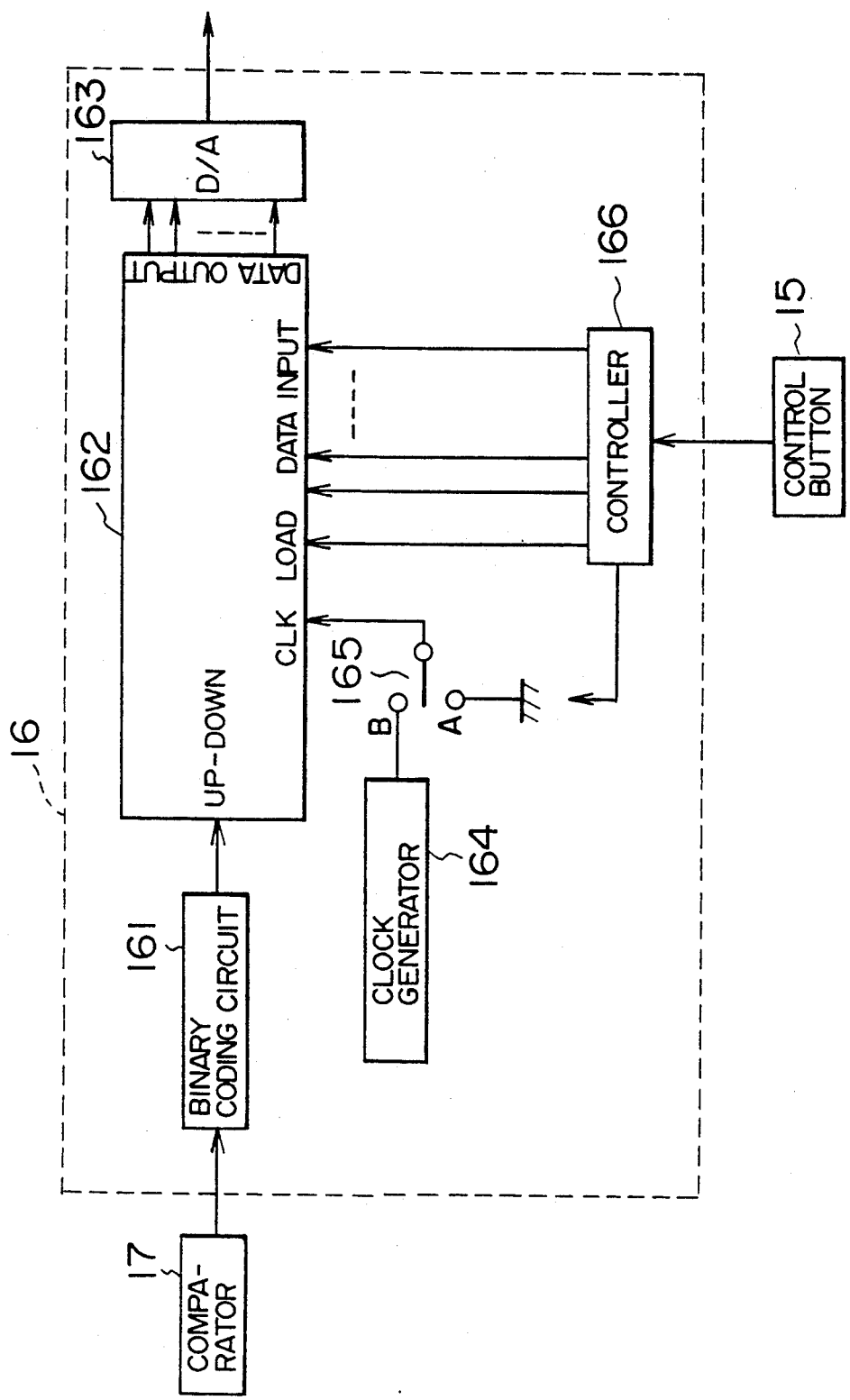

FIG. 7 shows an example in the case where the iris voltage changing circuit 16 of FIG. 5 is constructed as a digital circuit. In FIG. 7, reference numeral 161 designates a binary coding circuit, 162 designates an up-down counter, 163 designates digital-to-analog converter (hereinafter abbreviated to "D/A"), 164 designates a clock generator, 165 designates a switch, and 166 designates a controller. When the user selects automatic iris control through the control button 15, the switch 165 is turned to the side B. The up-down counter 162 performs up-counting and down-counting based on the level (HIGH/LOW) of the output voltage of the comparator 17. The result of the counting is outputted from the data output and converted into an analog signal by the D/A 163. Through the successive up/down counting operation, the output voltage of the D/A circuit 163 is finally made to be substantially equal to the iris voltage which is made to be a desired signal quantity. When manual iris control is selected through the control button 15, the switch 165 is turned to the side A, the up-down counter 162 takes in an iris voltage corresponding to a desired iris value through its data input and load terminals and then outputs the iris value through its data output terminal.

Another embodiment of the present invention is described with reference to FIG. 8. In this embodiment, the same reference numerals as those used in FIG. 5 designate the same parts as in FIG. 8. This embodiment shows an example of a camera in which manual-iris mode AE can be attained. The output of the comparator 17 is also connected to an exposure time changing circuit 21. When the user selects manual iris mode AE through a control button 19, the signal quantity is controlled suitably by changing the exposure period of time while keeping the iris value to a value designated by the user. A control circuit 20 maintains one of the iris voltage changing circuit 16 and the exposure time changing circuit 21 at the value designated by the user and performs automatic control upon the other based on the output of the comparator 17. An image pickup device driving circuit 22 serves to change signal sweep-out timing in increments or decrements of 1H and finely adjusts the signal read-out timing over a 1H period, so that the exposure time can be selected in an increment-/decrement finer than 1H.

Figure 8:
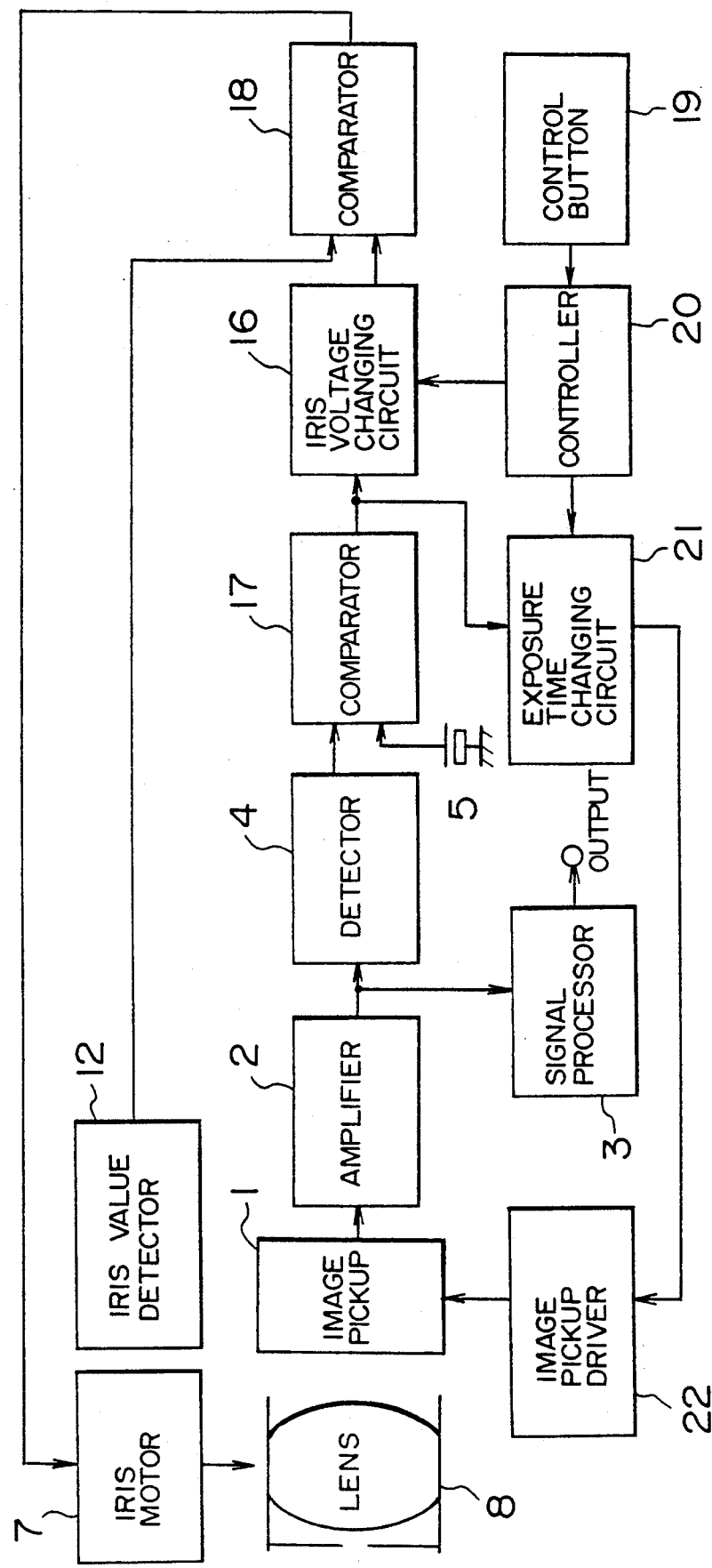
FIG. 8 is a block diagram of an image pickup apparatus as another embodiment of the present invention.

FIG. 9 shows an example of the output pulse of the image pickup device driving circuit 22 of FIG. 8. In FIG. 9, HD represents a horizontal synchronizing signal and SUB represents a substrate voltage. SG represents a pulse indicating signal transfer timing from a photoelectric element to a vertical register. As described in NIKKEI MICRODEVICE, No. 10, pp 63–64, October 1987, the signal charge in the photoelectric element can be swept out to the substrate by raising the level of SUB in a horizontal blanking period. The period of time from the point of time when last sweeping-out is finished to the point of time when the level of SG becomes high is the exposure period of time. When the level of SG becomes high, the potential of the vertical register is lowered so that the signal charge is read out from the photoelectric element to the vertical register. As shown in the drawing, the timing of increasing the level of SG can be selected freely in the period of 1H as long as the timing is in the vertical blanking period. Accordingly, a continuously variable shutter can be attained. The gate of SG (signal read-out gate) does not always exist in the image pickup device 1. In general, the potential of the vertical register is lowered by adjusting the clock of the vertical register to the highest of three values at the point in time when the level of SG becomes high.

FIG. 10 shows an example of an increment/decrement amount ΔT for changing the exposure period of time T. Because the increment/decrement amount ΔT decreases as the exposure period of time decreases, the signal quantity change when one increment/decrement is caused in the range of 262H (1/60 sec.) to 1H (1/16000 sec.) is set to be within a range of 1% of the signal quantity before the increment/decrement. Accordingly, the displacement of the signal quantity from a predetermined center value of the signal quantity is not more than 1% even if the exposure control is performed while changing only the exposure period of time. Thus, stable signal quantity control can be attained.

Figure 12:
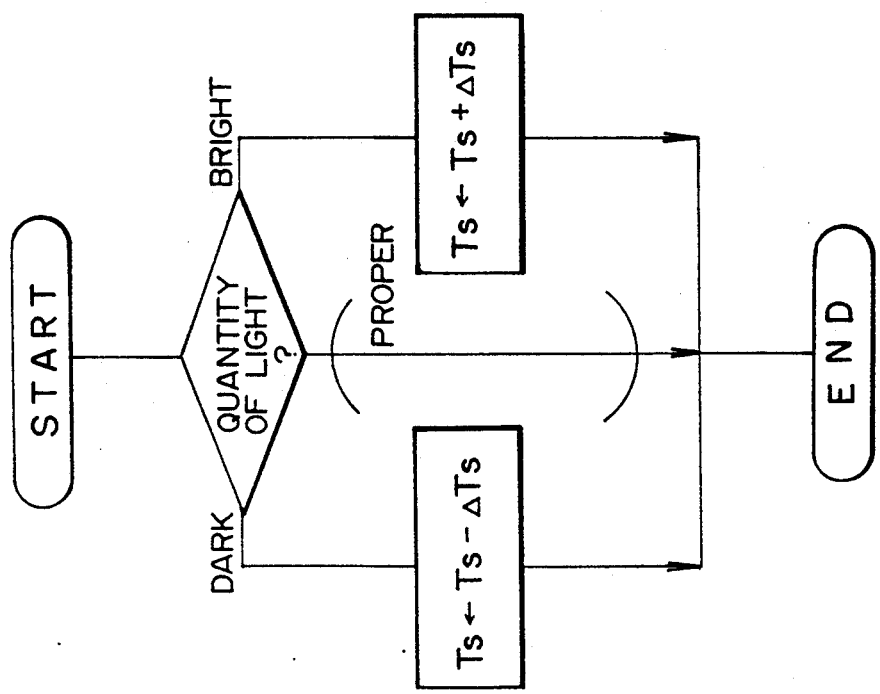

In the following, exposure control based on the operation of the sweep-out timing and exposure control based on the operation of both the sweep-out timing and the read-out timing are described with reference to FIGS. 11 through 13 in the case where this embodiment is realized by use of a microcomputer.

FIG. 11 is a timing chart of pulses related to an electronic shutter. In FIG. 11, the same pulses as those in FIG. 9 are referenced correspondingly.

In the drawing, the exposure period of time is the period from the sweep-out point of time Ts to the read-out point of time Tr. The sweep-out point of time Ts is variable in an increment/decrement of ΔTs (=1H). The read-out point of time Tr is variable in an increment/increment of ΔTr within a range between Tmn and Tmx in 1H within a vertical blanking period. The period of time between Tmn and Tmx is equal to the period of 1H.

First, exposure control based on the operation of the sweep-out point of time Ts is described with reference to the flow chart of FIG. 12. The quantity of light is judged first. A new Ts is then prepared by adding ΔTs to Ts or by subtracting ΔTs from Ts, based on the result of the judgment. Accordingly, the minimum increment/decrement amount in exposure control is ΔTs (=1H).

Next, exposure control based on the operation of both the sweep-out point of time Ts and the read-out point of time Tr is described with reference to the flow chart of FIG. 13. The quantity of light is judged first, and the phase of the read-out pulse is judged. Assuming now that Tr is equal to Tmn, Tr is changed to Tmx because of the necessity for carry and then ΔTs is added to Ts. The period of time between Ts and Tmn is equal to the period of time between Ts+ΔTs and Tmx. Then, Tr is shifted by ΔTr. As a result, the minimum increment or decrement amount in exposure control is ΔTr so that fine exposure control can be made.

Hardware for attaining this embodiment can be constructed by using a known logic technique.

Figure 14:
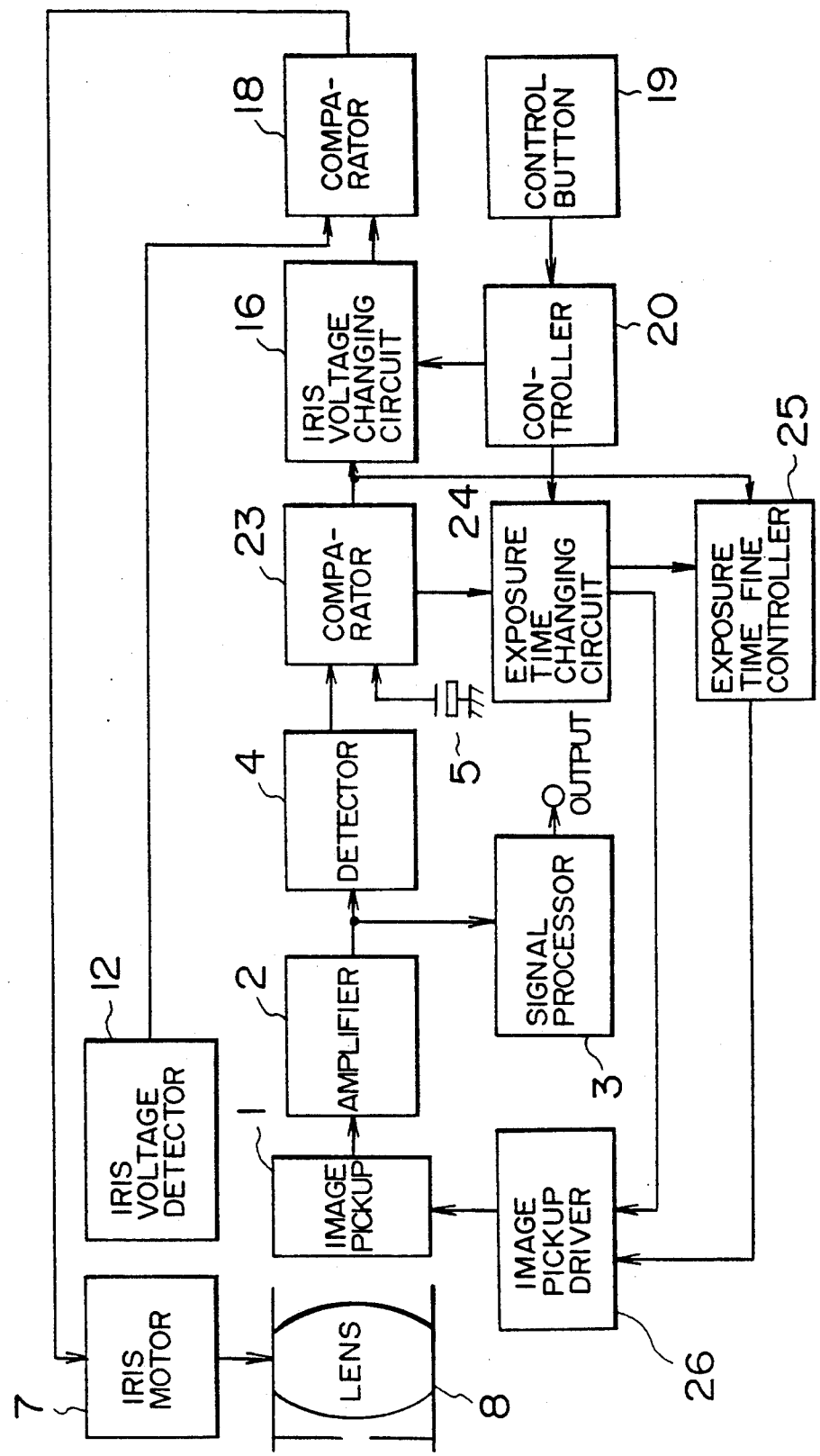
FIG. 14 is a block diagram showing a further embodiment of the image pickup apparatus according to the present invention.

In the following, a further embodiment of the present invention is described with reference to FIG. 14. In this embodiment, same reference numerals as those used in the foregoing embodiments designate same as those parts in those foregoing embodiments. This embodiment shows an example of an AE camera operable in manual-iris mode and constructed by using an image pickup device driving circuit 26 having a terminal for controlling the exposure period of time in an increment or decrement of every horizontal scanning period (1H) and another terminal for finely tuning the exposure period time over 1H. A comparator 23 has two output terminals. A signal from one output terminal of the comparator 23 is supplied to the iris voltage changing circuit 16 and an exposure time fine tuning circuit 25. A signal from the other output terminal of the comparator 23 is supplied to an exposure time changing circuit 24.

The gain in the latter output of the comparator 23 is set to be lower than that in the former output thereof, because the latter output is used for rough exposure time control in an increment or decrement of 1H. Upon detecting an input signal from the comparator 23 in a predetermined range, the exposure time changing circuit 24 stops the rough (1H-increment or decrement) exposure time control and operates the exposure time fine tuning circuit 25. The exposure time fine tuning circuit 25 and the image pickup device driving circuit 26 finely tune the signal charge read-out timing from the photoelectric element to the vertical register based on the output of the comparator 23. Although the range of the fine tuning requires at least 1H, the range can be enlarged to the order of several horizontal scanning periods (several Hs).

An example of exposure control based on the operation of both the exposure time changing circuit 24 and the fine tuning circuit 25 is described with reference to FIGS. 15 and 16.

Figure 15:
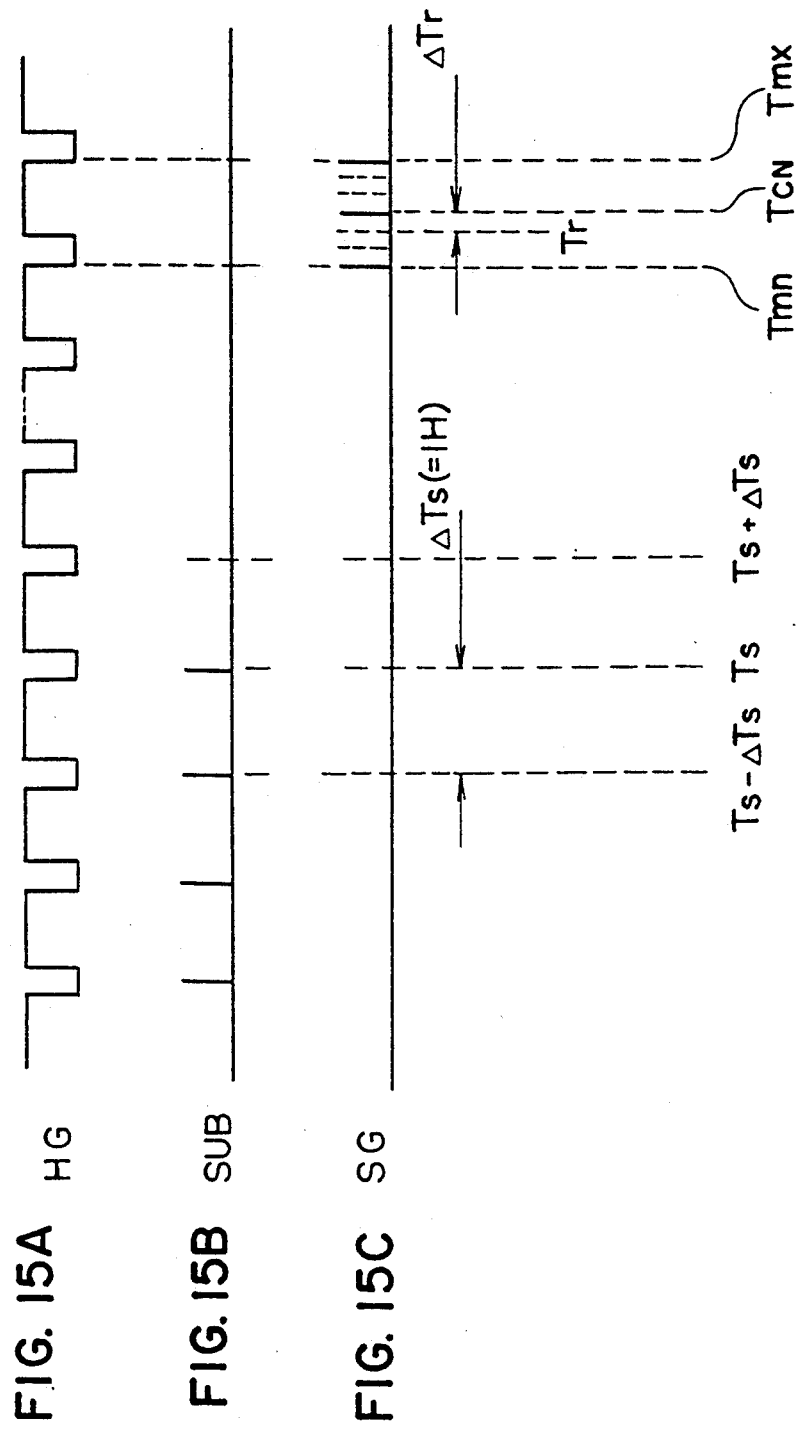
FIGS. 15A–15C and 16 are views for explaining control in the case where the embodiment in FIG. 14 is realized by use of a microcomputer.
Figure 16:
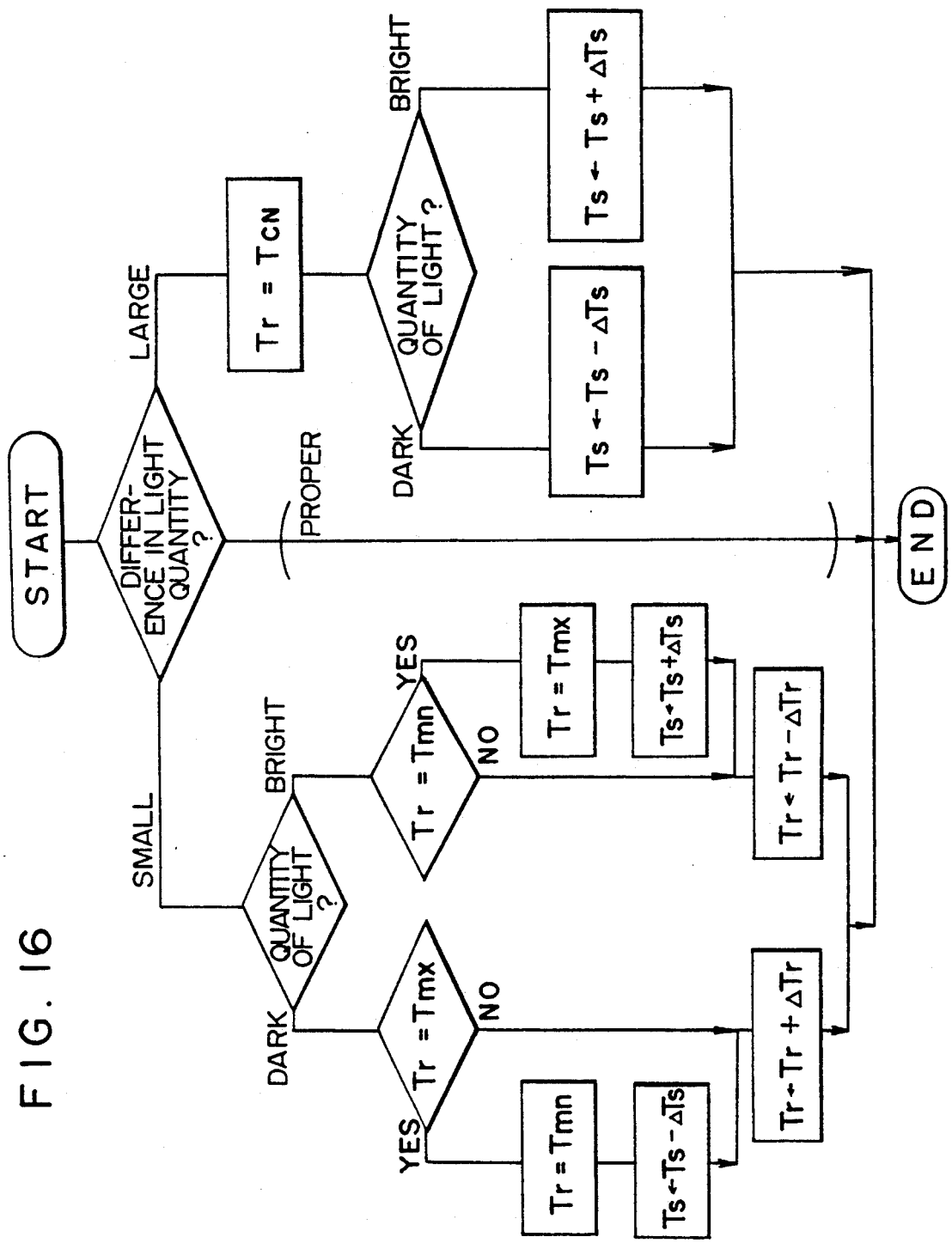

FIG. 15 is a timing chart similar to FIG. 11. FIG. 16 is a flow chart showing the operation of the comparator 23, the exposure time changing circuit 24 and the exposure time fine tuning circuit 25 in the case where this embodiment is realized by use of a microcomputer. Features of this example are as follows.

(1) The exposure time changing circuit 24 serves to control the phase of the sweep-out pulse Ts and, on the other hand, the exposure time fine tuning circuit 25 serves to control the phase of the read-out pulse Tr.

(2) The difference between the current exposure light quantity and the proper exposure light quantity is calculated and the obtained value is classified into either a large difference or a of small difference.

(3) When the difference is large, the current exposure light quantity is changed to the proper exposure light quantity by using the exposure time changing circuit 24. At this time, the exposure time fine tuning circuit 25 fixes the phase of read-out pulse SG to $T_{CN}$ as a middle phase between of Tmn and Tmx and then keeps the phase in this state.

Figure 13:
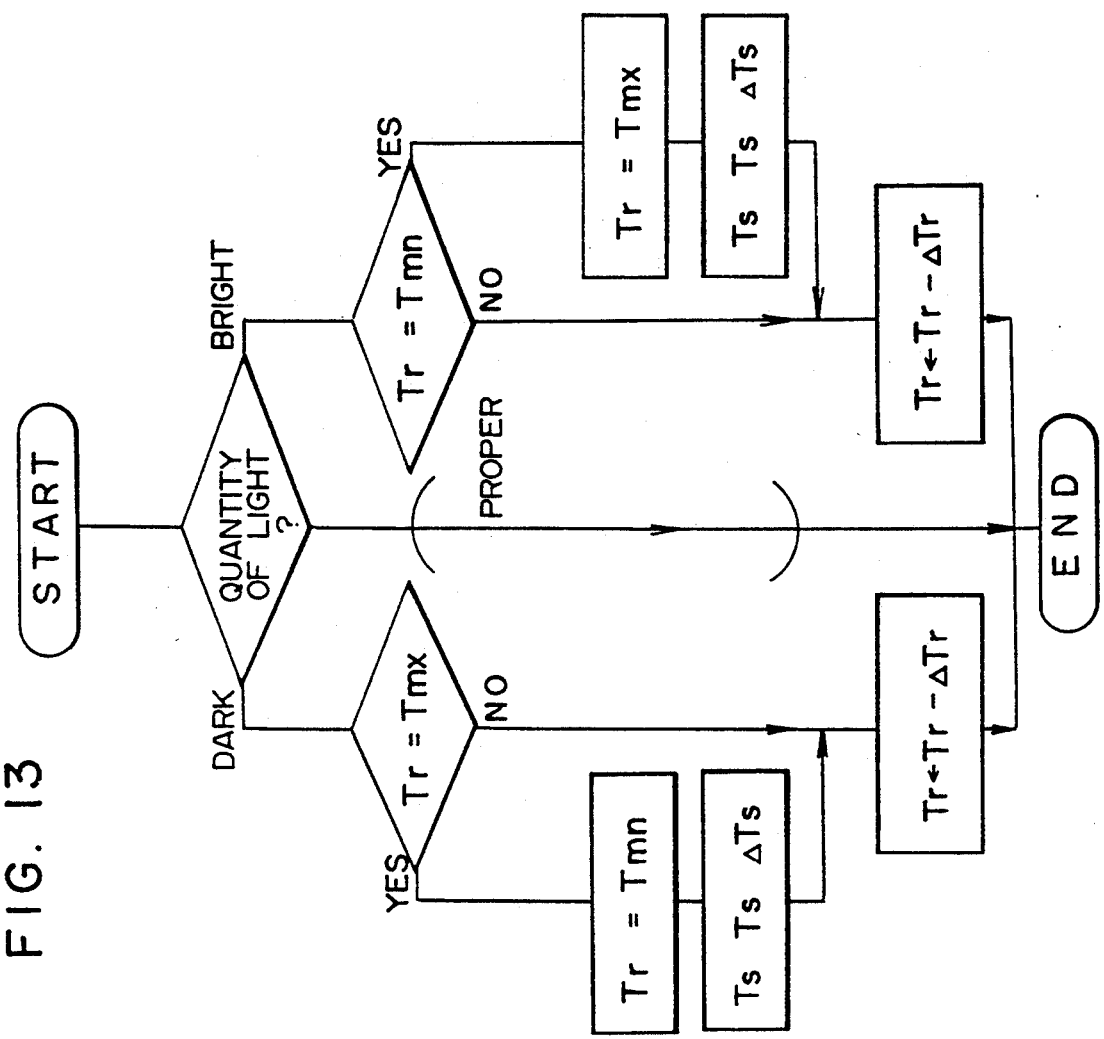

(4) When the difference is small, the controlling procedure as shown in FIG. 13 is carried out, carrying out a main control by the exposure time fine tuning circuit 25. When the phase of the read-out pulse satisfies the relation Tr=Tmx or Tr=Tmn, the exposure time fine tuning circuit 25 informs the exposure time changing circuit 24 of this fact to thereby shift the phase of the sweep-out pulse Ts by ΔTs.

The image pickup device driving circuit 26 in this embodiment has an advantage in that the circuit can be provided in the form of a simple logic circuit, compared with the image pickup device driving circuit 22 in FIG. 8.

Figure 17:
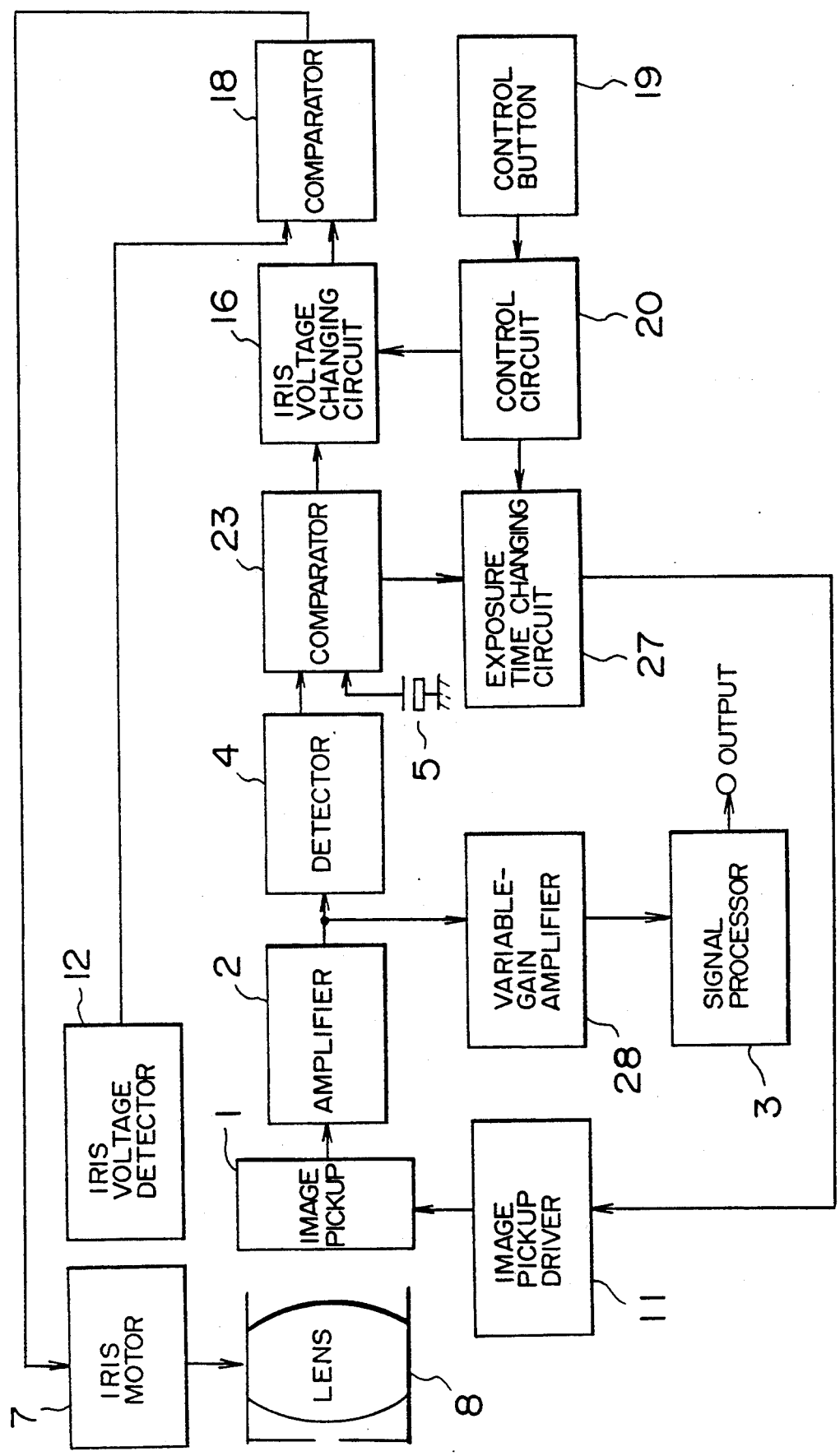
FIG. 17 is a block diagram showing a further embodiment of the image pickup apparatus according to the present invention.
Figure 18:
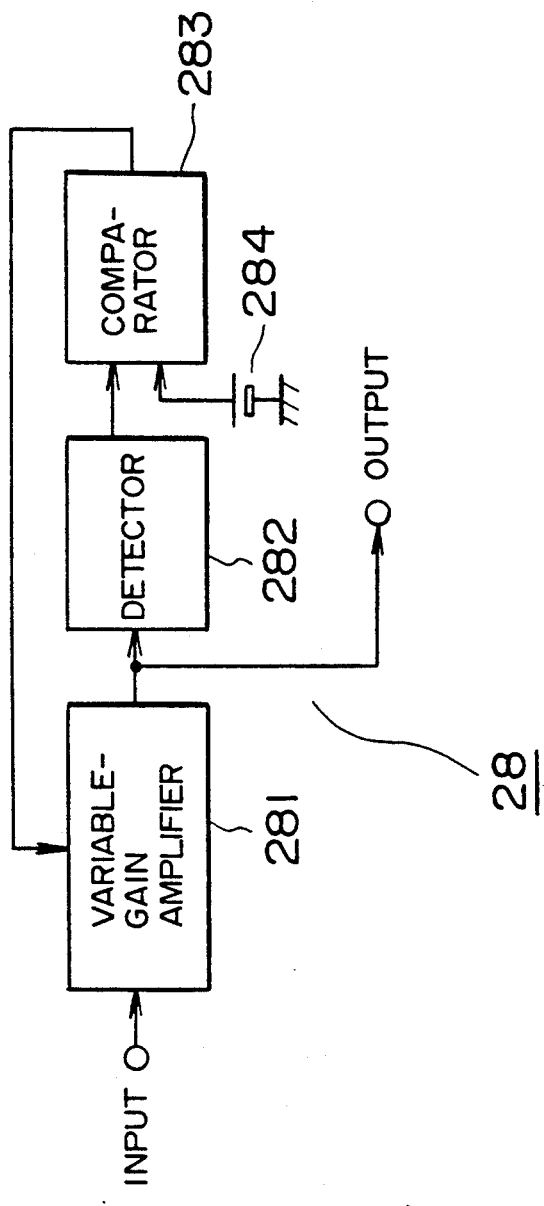
FIG. 18 is a diagram showing an example of the configuration of the variable-gain amplifier depicted in FIG. 17.

In the following, a further embodiment of the present invention is described with reference to FIG. 17. In this embodiment, the same reference numerals as those used in the foregoing embodiments designate the same parts in the foregoing embodiments. This embodiment shows an example of a camera in which manual-iris mode AE is attained by using the image pickup device driving circuit 11 for controlling the exposure period of time in an increment or decrement of 1H. Control in an increment or decrement of 1H may be carried out as shown in FIG. 12. Rough exposure time control at in an increment or decrement of 1H is carried out by the comparator 23, an exposure time changing circuit 27 and the image pickup device driving circuit 11. The signal quantity is finely tuned by a variable-gain amplifier 28 provided outside of the rough exposure control loop so that the signal quantity is kept constant. The variable-gain amplifier 28 is different from a conventional variable-gain amplifier used for increasing the gain at the time of a shortage of the quantity of light. More specifically, the variable-gain amplifier 28 can operate even in the case where the iris is not in a fully opened state. The conventional variable-gain amplifier has an AGC killer by which the gain is minimized when the iris is closed even in the least amount (in other words, when light quantity is not insufficient). However, the variable-gain amplifier in this embodiment has no AGC killer. An example of the variable-gain amplifier is shown in FIG. 18. The output signal level can be kept constant by negative feed back of the output of a detector 282 to a gain control terminal of a variable-gain amplifier 281 after comparing the output of the detector 282 with a constant voltage source 284 in a comparator 283.

Figure 19:
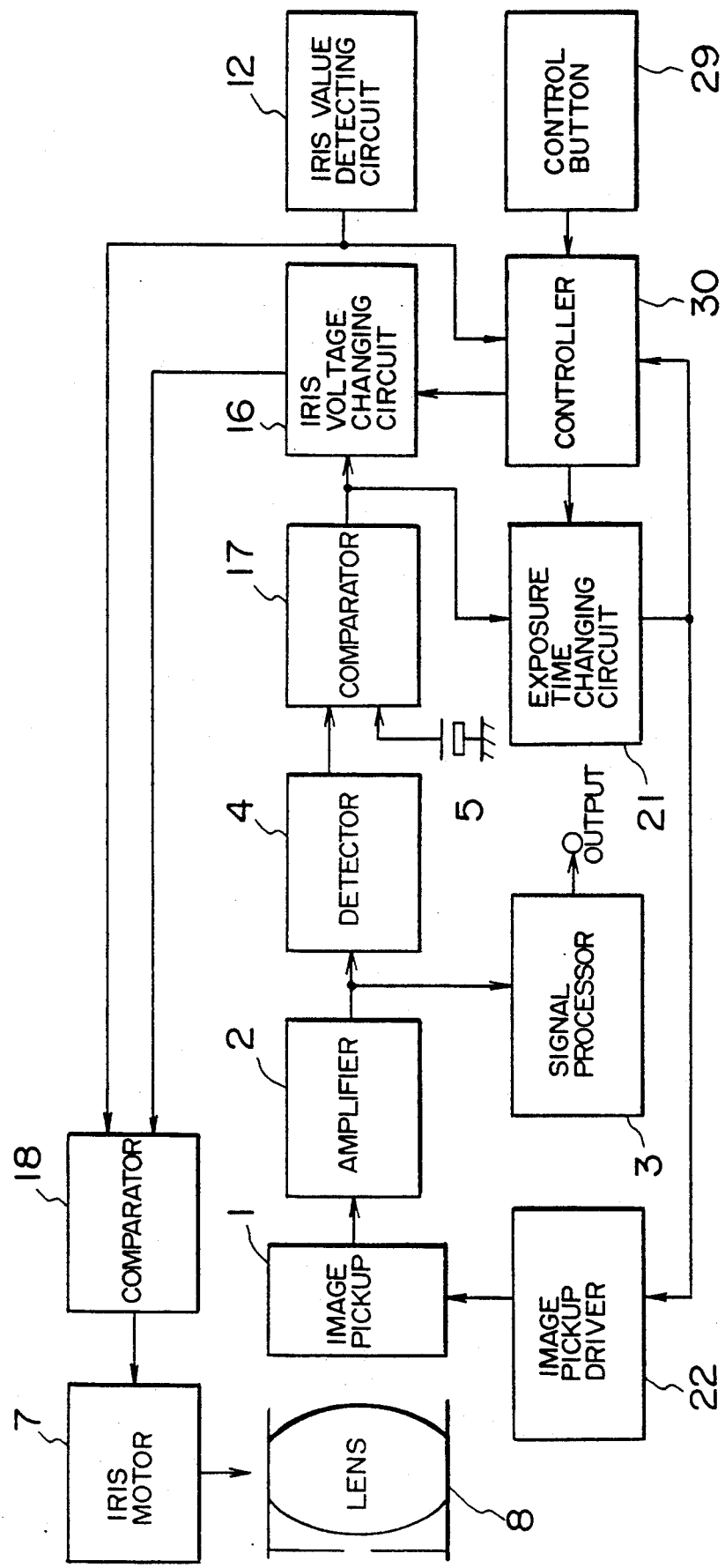
FIG. 19 is a diagram showing a further embodiment of the image pickup apparatus according to the present invention.

In the following, a further embodiment of the present invention is described with reference to FIG. 19. In this embodiment, the same reference numerals as those used in the foregoing embodiments designate the same parts as in those foregoing embodiments. This embodiment shows an example of a camera in which the exposure control of manual exposure control, manual-exposure time mode AE, manual iris mode AE and programmed AE can be attained. A controller 30 receives the information from a control button 29 operated by the user, the iris value information from the iris value detecting circuit 12 and the exposure time information from the exposure time changing circuit 21 so that programmed AE control based on various programs can be carried out.

Figure 4:
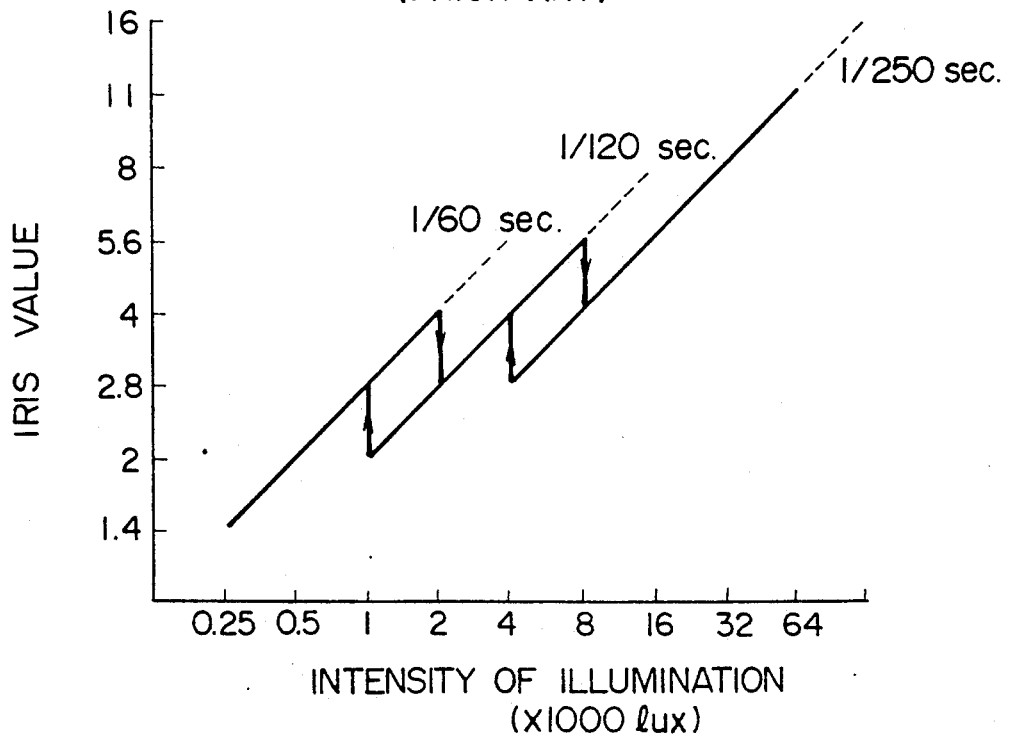
FIG. 4 is a graph showing the relationship between the iris value and exposure period of time in programmed AE.
Figure 20:
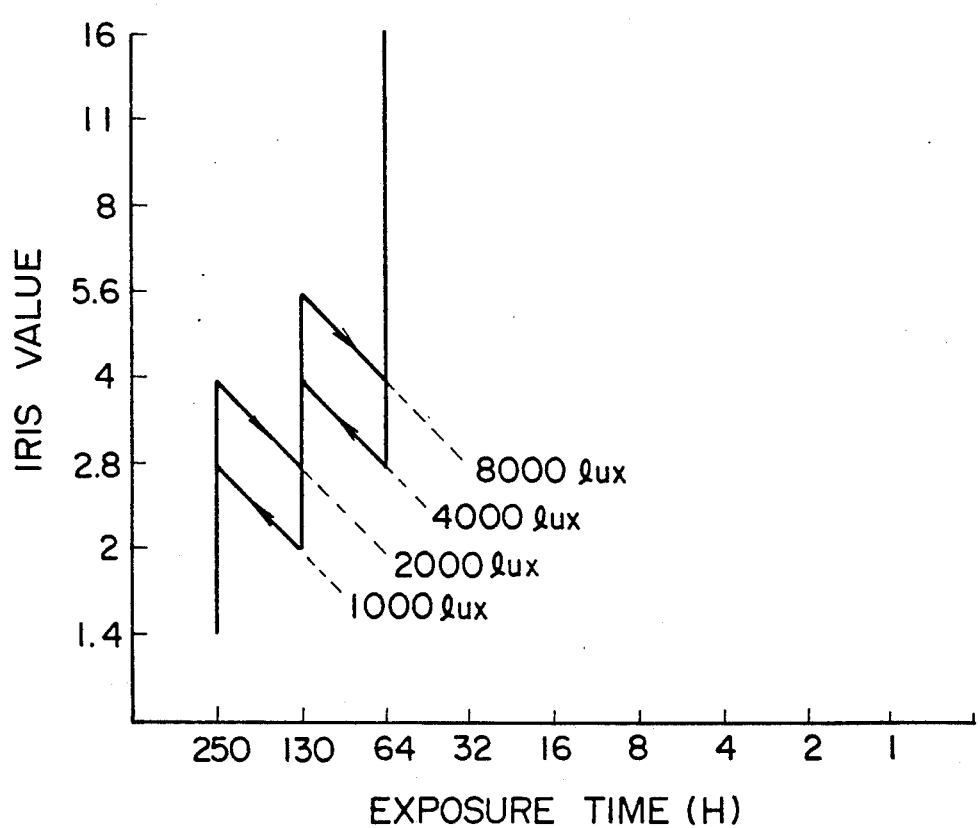
FIG. 20 is a graph showing an example of a control curve in conventional programmed AE.
Figure 21:
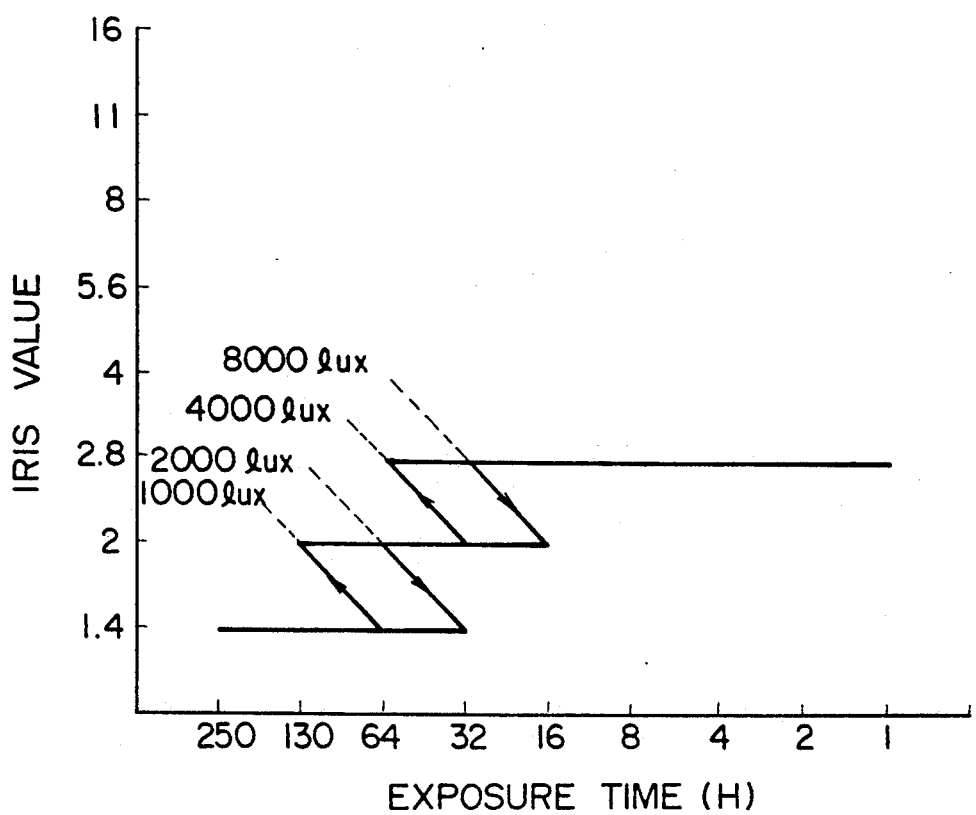
FIGS. 21 through 23 are graphs showing examples of control curves in new programmed AE which can be realized by the embodiment of the image depicted in FIG. 19.
Figure 22:
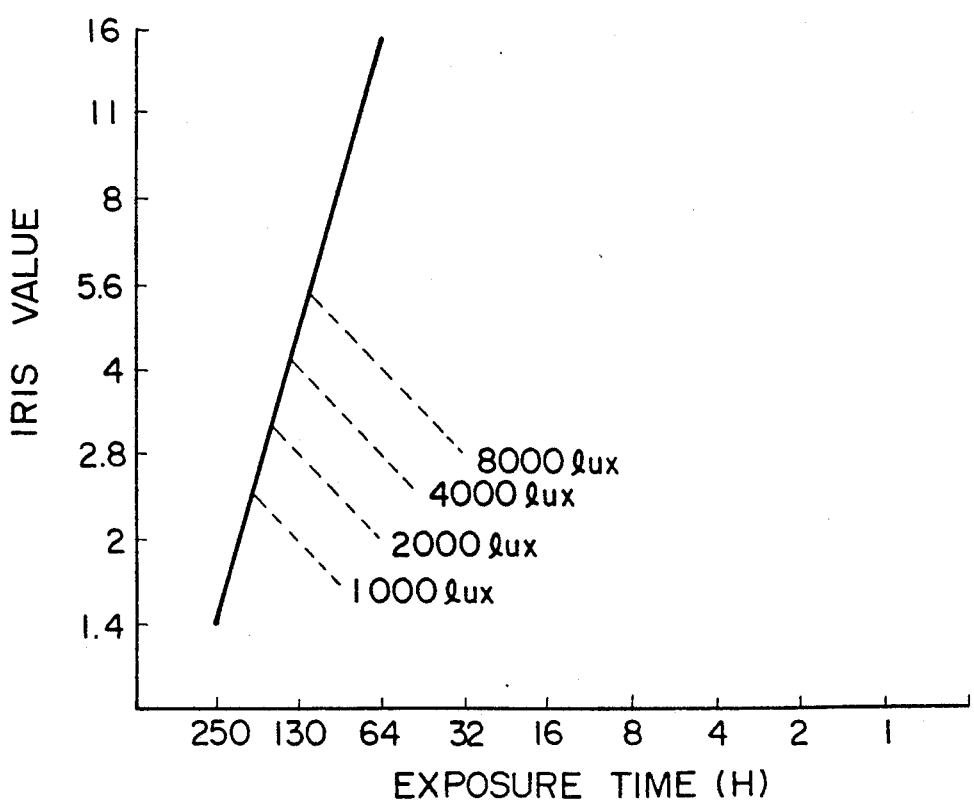
Figure 23:
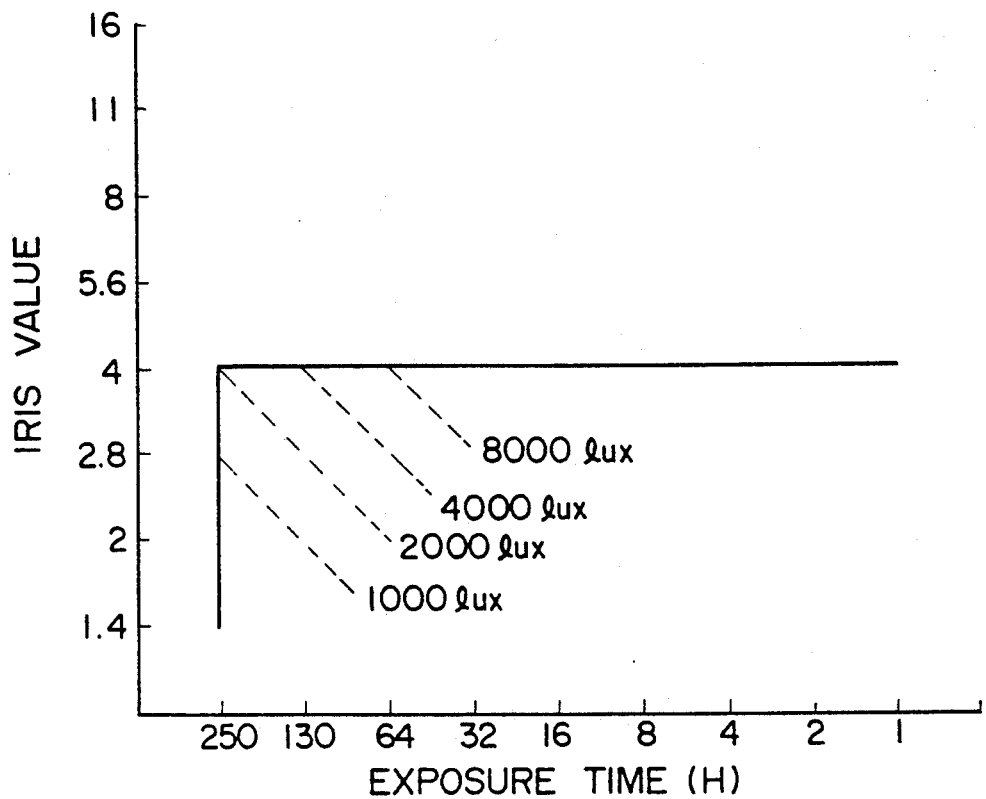
Figure 24:
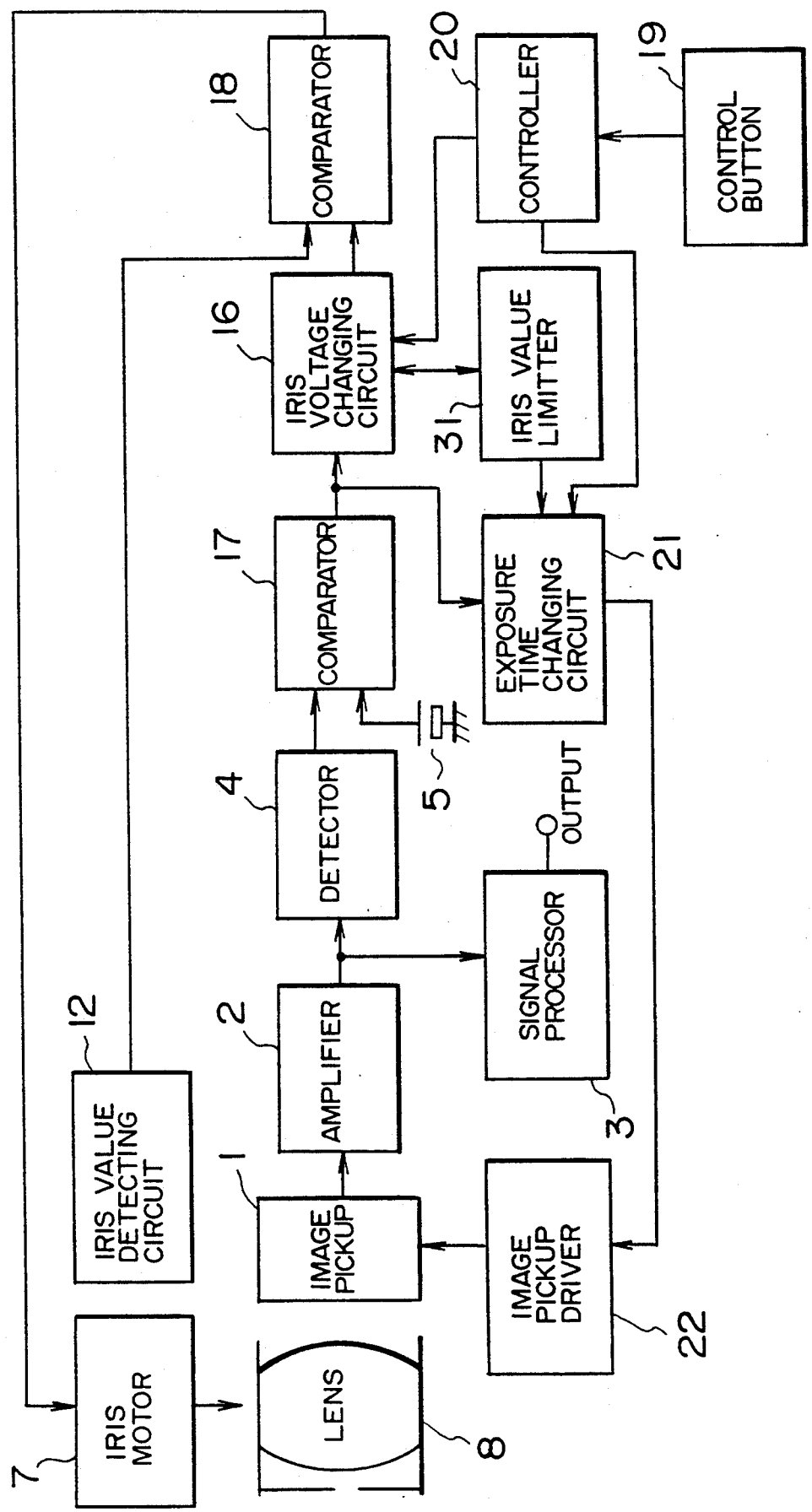
FIG. 24 is a block diagram showing a further embodiment of the image pickup apparatus according to the present invention.

FIG. 20 is a graph with the exposure period of time as the abscissa, showing the same control curve as that in conventional programmed AE in FIG. 4. FIGS. 21 through 23 are graphs with the exposure period of time as the abscissa, showing examples of control curves in a new programmed AE. FIG. 21 shows programmed AE in which the iris value is changed according to the information of exposure period of time, as opposed to FIG. 20. FIG. 22 shows programmed AE in which both the iris value and the exposure time are operated continuously and interlockingly. FIG. 24 shows programmed AE in which automatic iris control and automatic exposure time control are switched over at a suitable iris value (for example, F4). In any case, programmed AE can be attained by the configuration of the embodiment of FIG. 19.

Figure 25:
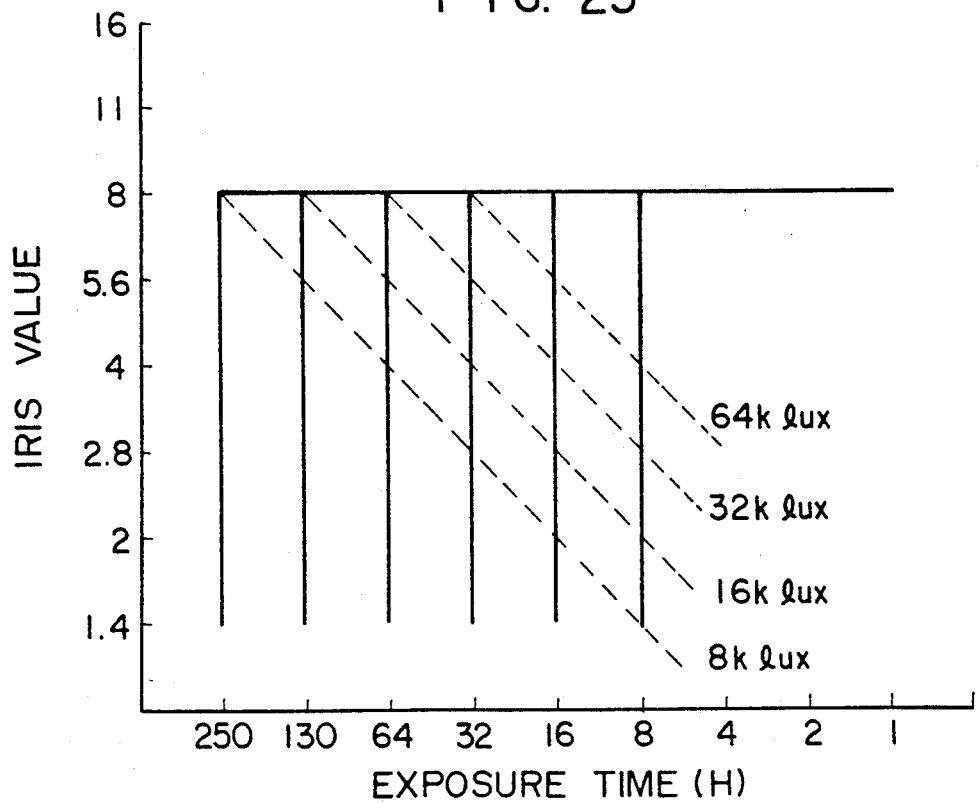
FIG. 25 is a graph showing an example of exposure control which can be realized by the embodiment of the image pickup apparatus depicted in FIG. 24.

In the following, a further embodiment of the present invention is described with reference to FIG. 24. This embodiment shows an example in which an iris value limiting circuit 31 is added to the embodiment of FIG. 8 to thereby limit a desired iris value to not more than a predetermined value. The exposure time is controlled automatically corresponding to the limitation of the iris value to thereby keep the signal level constant. An example of the exposure control is shown in FIG. 25. In this example, when the subject is so lighted that the iris value reaches F8, the iris value is fixed to F8 regardless of the exposure period of time designated by the user. That is, the signal level can be kept constant by shortening the exposure time. In the case of a ½ inch optical system, iris related blur caused by diffraction occurs minimally with the iris set at about F8. Accordingly, a camera with no iris related blur can be provided.

Figure 26:
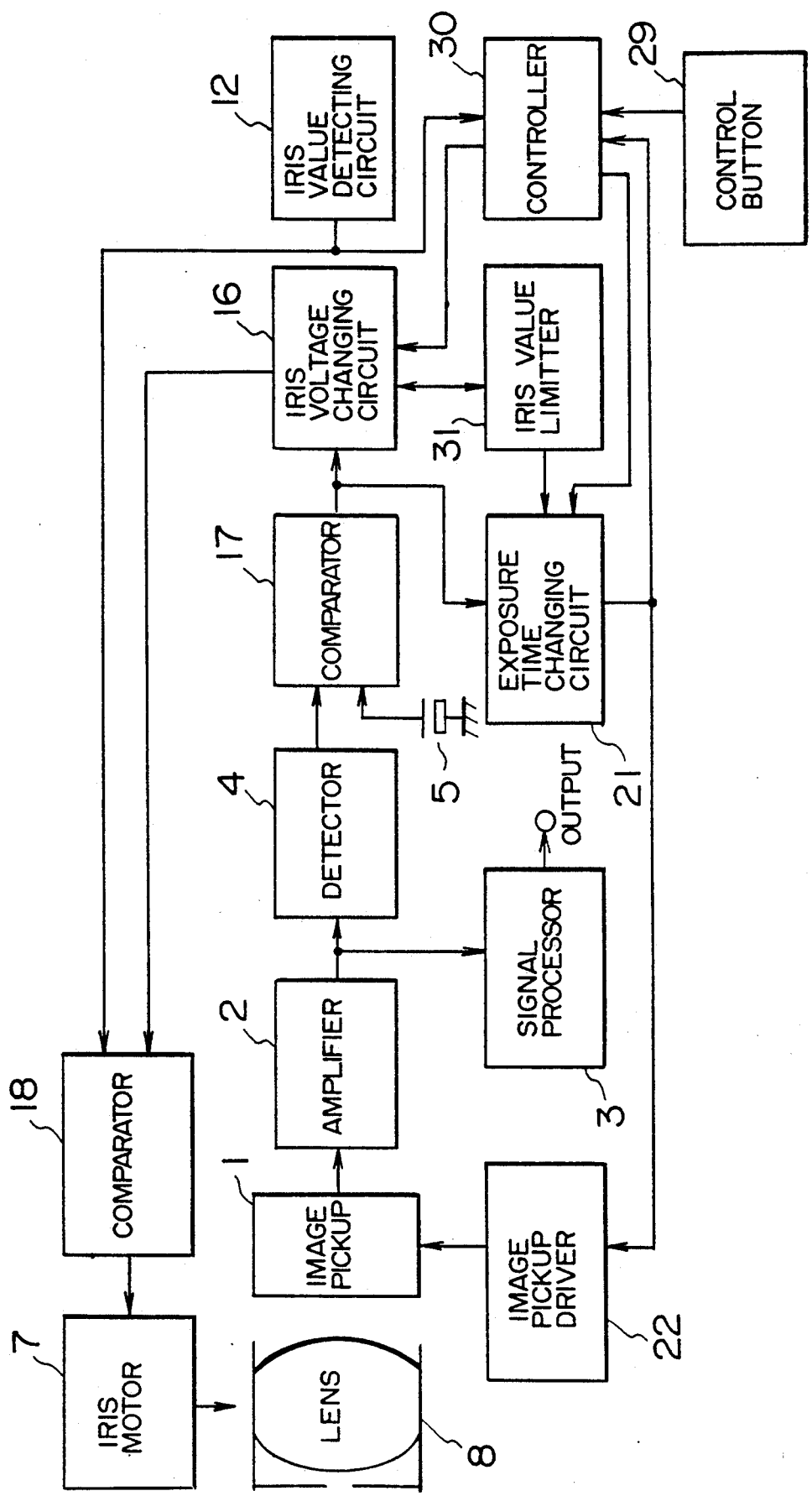
FIG. 26 is a block diagram showing a further embodiment of the image pickup apparatus according to the present invention.
Figure 27:
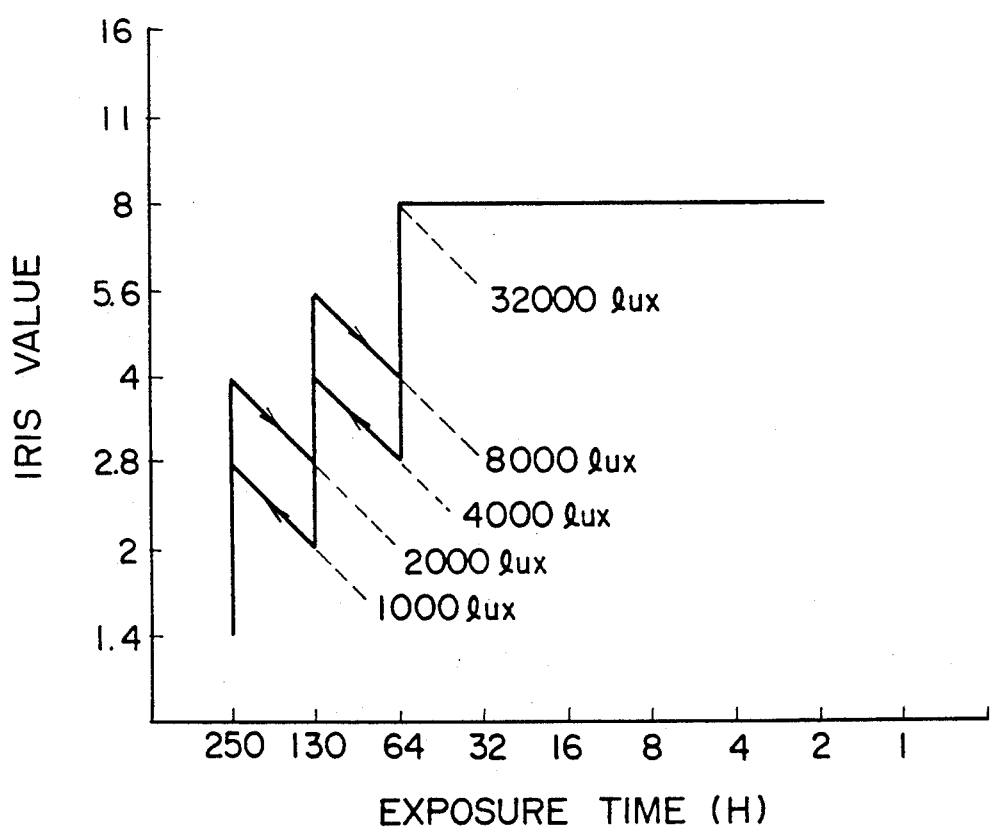
FIG. 27 is a graph for explaining exposure control which can be realized by the embodiment of the image pickup apparatus depicted in FIG. 26.

In the following, a further embodiment is described with reference to FIG. 26. In this embodiment, the same reference numerals as those used in the foregoing embodiments designate the same parts as in the foregoing embodiments. This embodiment shows an example in which an iris value limiting circuit 31 is added to the embodiment of FIG. 19 to thereby limit a desired iris value to not more than a predetermined value. In this embodiment, iris related blur can be prevented even in the case where the user selects programmed AE. An example of the exposure control is shown in FIG. 27. Even in the case where programmed AE is selected, the iris value is forcedly fixed to F8 when the subject is so intensely lighted that the iris value reaches F8. That is, the signal level can be kept constant by shortening the exposure period of time.

Figure 28:
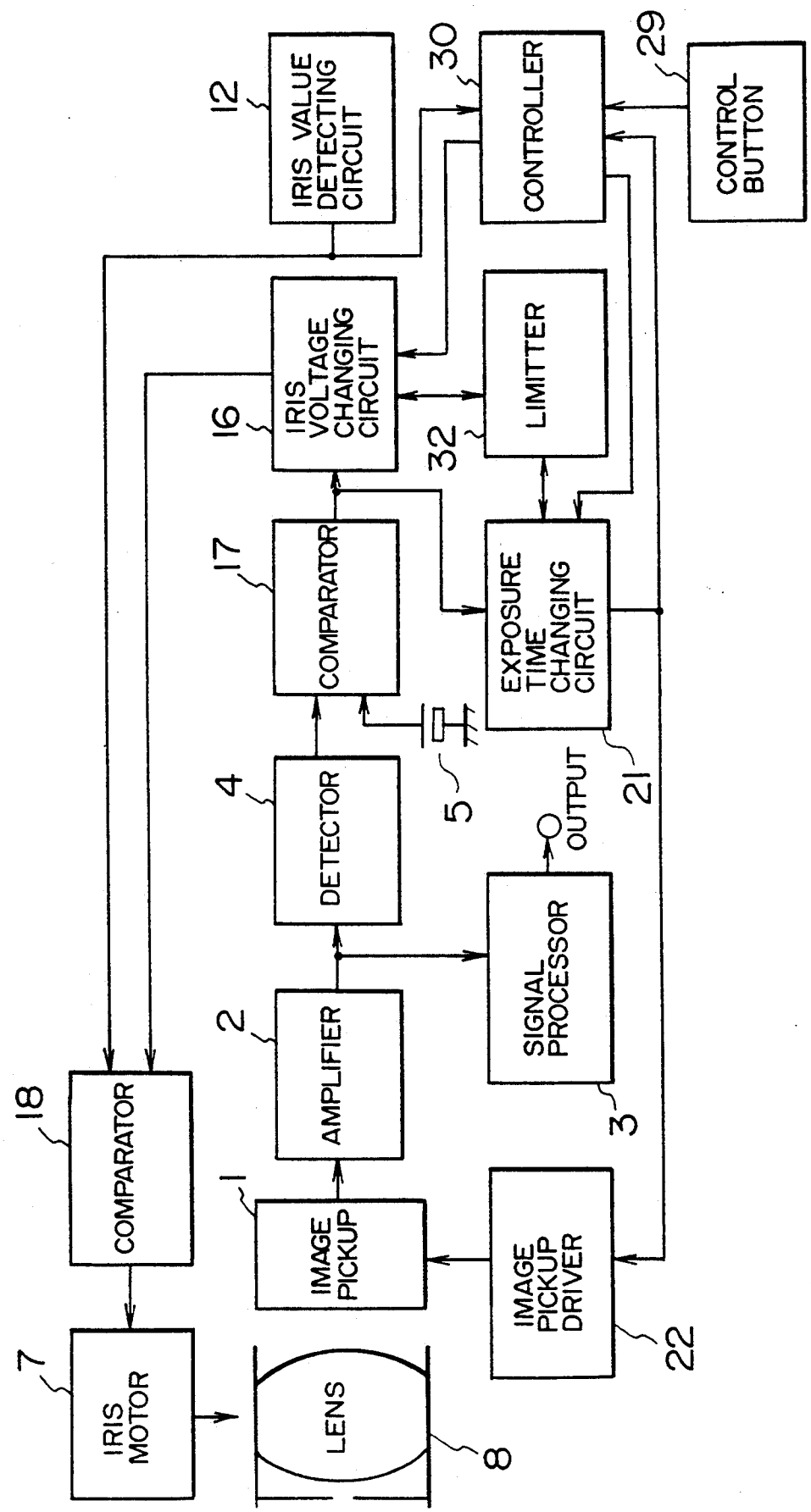
FIG. 28 is a block digram showing a further embodiment of the image pickup apparatus according to the present invention.
Figure 29:
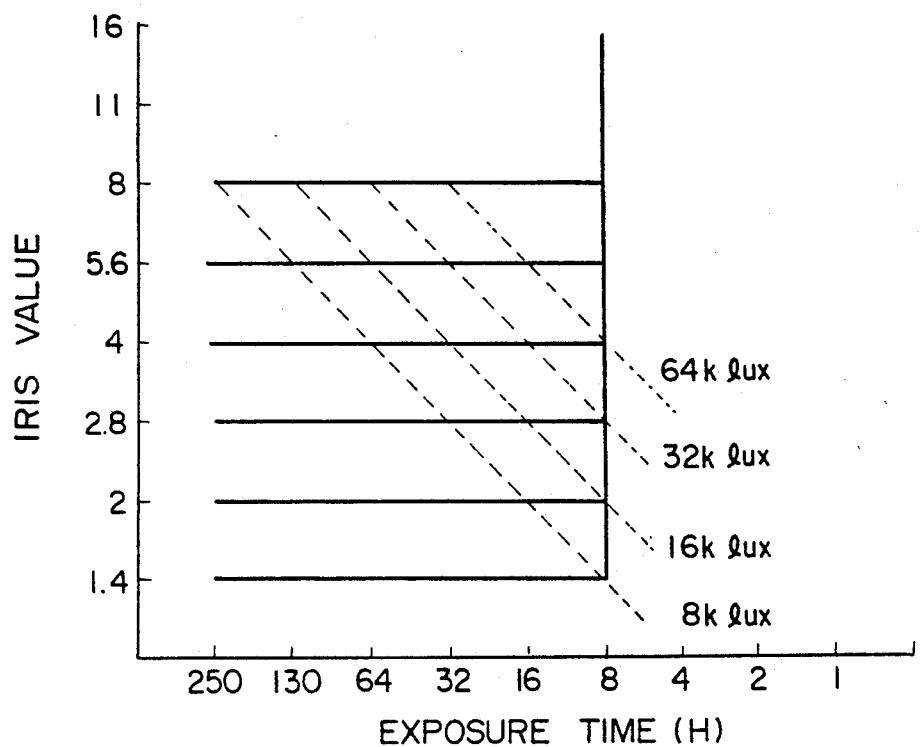
FIG. 29 is a graph showing exposure control which can be realized by the embodiment of the image pickup apparatus depicted in FIG. 28.

In the following, a further embodiment is described with reference to FIG. 28. In this embodiment, the same reference numerals as those used in the foregoing embodiments designate the same parts as in the foregoing embodiments. This embodiment shows an example in which the iris value limiting circuit 31 in FIG. 26 is replaced by a limiting circuit 32 for limiting the exposure period of time not shroter than a predetermined value as well as limiting the iris value. Even in the case where the user selects a specific iris value in manual-iris mode AE mode, exposure control is carried out as follows. When intense light enters so that the exposure period of time is shortened to a predetermined value, the exposure period of time is fixed to the predetermined value so that exposure control is carried out by increasing the iris value. By providing a limitation on the exposure period of time as described above, the scale of the image pickup device driving circuit 22 as shown in the embodiment of FIG. 8 can be reduced. An example of the manual-iris mode AE exposure control is shown in FIG. 29. In this example, the exposure period of time is limited so as not to be shorter than 8 H (1/2000 sec). If the increment or decrement ΔT of exposure period of time is designed according to the example of FIG. 10, it is sufficient that the increment or decrement is equal to H/16. Accordingly, in this case, the image pickup device driving circuit 22 can be constructed in the form of a simple logic circuit, compared with the case where the increment/decrement is H/128 or less.

Figure 30:
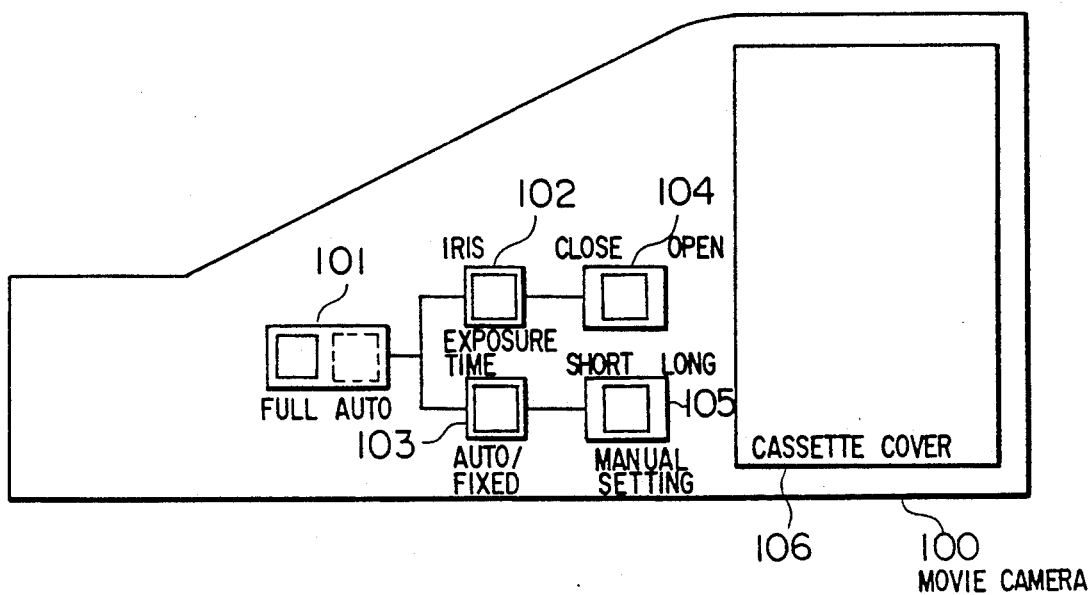
FIG. 30 is a view showing an example of the appearance of the image pickup apparatus according to the present invention.

In the following, a further embodiment is described with reference to FIG. 30. This embodiment shows an example of external appearance of a video movie camera having control buttons for selecting four exposure control modes, namely, programmed AE, manual-iris mode AE, manual-exposure time mode AE and manual exposure control, as shown in FIGS. 19, 26 and 28. A group of button switches are provided on one side of a casing of a movie camera 100 and between an object lens and a cassette cover 106. When, for example, the slide switch 101 is set to the left, full automatic exposure control is selected so that programmed AE starts. When the push switch 102 is pushed after the slide switch 101 is set to the right, the iris value is fixed to a set value so that manual iris mode AE starts. When the left-right push switch 104 is then pushed to the left, the iris is changed so as to be closed. When the left-right push switch 104 is pushed to the right, the iris is changed so as to be opened. When the push switch 102 is pushed once more, the iris control is returned to automatic as a programmed AE mode. When the push switch 103 is pushed in this condition, the exposure period of time is fixed to a set value so that manual exposure time mode AE starts. When the left-right push switch 105 is pushed left or right in this condition, the exposure period of time is changed. When the push switch 102 is then pushed to set the two switches to manual, a manual exposure control mode starts so that both the iris value and the exposure period of time can be designated suitably by operating the left-right switches 104 and 105 by the user.

Indications such as indication of the iris value and exposure period of time, indication of the exposure control mode, an alarm indication at the time of manual exposure control, and the like, may be made in the vicinity of the switches 101 to 105 or may be made in an electronic view finder. In any case, a desired one of the exposure control modes can be easily selected by the user through the control buttons arranged as shown in FIG. 30.

In the following, a further embodiment is described with reference to FIGS. 31 through 33. This embodiment shows an example in which a manual-iris mode AE function and a function (iris stopper) of preventing iris related blur are provided in a camera for performing auto-iris exposure control.

Figure 31:
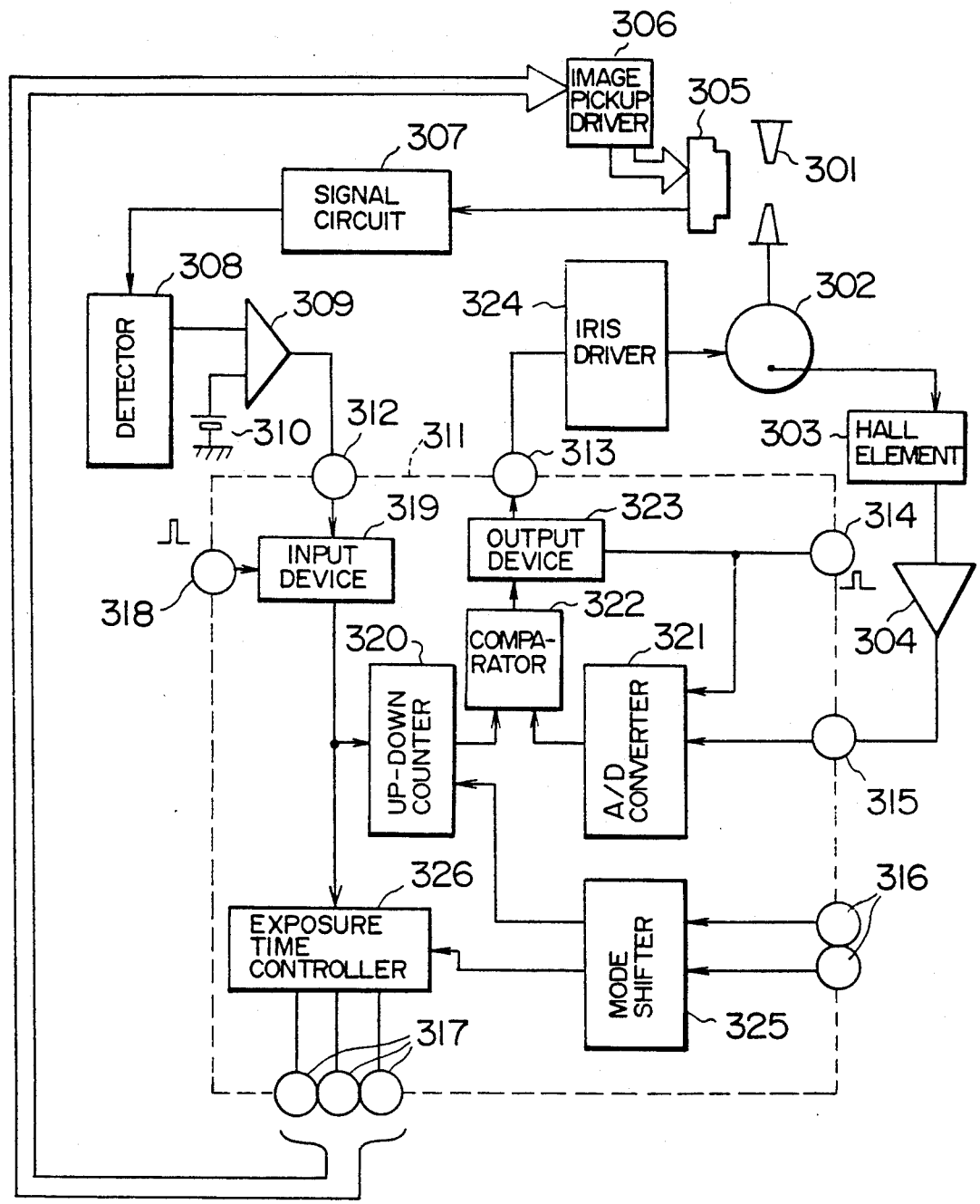
FIG. 31 is a block diagram showing a further embodiment of the image pickup apparatus according to the present invention.
Figure 32:
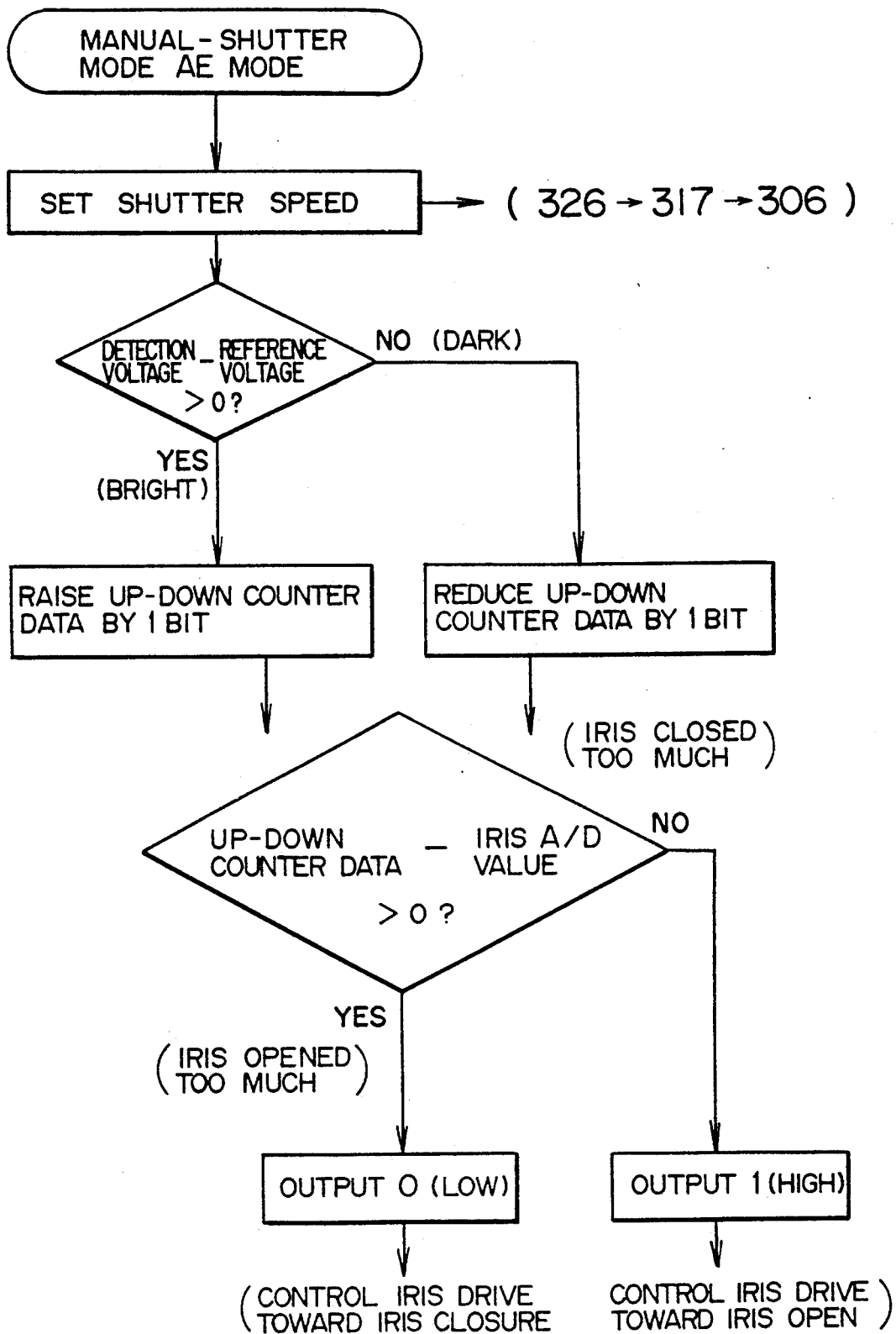
FIG. 32 and 33 are flow charts showing the operation of the image pickup apparatus in this embodiment.

In FIG. 31 reference numeral 301 designates an iris, 302 designates an iris motor, 303 designates an iris position detecting element (Hall element) mounted on the iris motor, 304 designates an amplifier for amplifying the output of the Hall element, 305 designates an image pickup device in which the exposure period of time or electronic shutter speed can be controlled continuously in one horizontal scanning period or less, 306 designates an iamge pickup device driving circuit, 307 designates a camera signal circuit, 308 designates an iris detection circuit, 309 designates a comparator, and 310 designates a reference voltage source. A portion 311 surrounded by broken lines shows a microcomputer. In this embodiment, processing by the microcomputer 311 is shown as a functional block diagram. Reference nuemrals 312 to 318 designate terminals. Reference nuemral 319 designates a signal input circuit (binary coding circuit) in which a signal is taken in the microcomputer 311 based on timing pulse applied on the terminal 318. Reference nuemral 320 designates an up-down counter for performing counting-up/down of data based on the result (high/low) of comparison in the comparator 309. Reference numeral 321 designates an A/D converter for performing A/D conversion or iris value information. Reference numeral 322 designates a comparator for comparing data of the up-down counter 320 and iris value data with each other. Reference numeral 323 designates an output device for sending out a high-level or low-level voltage based on the result of the comparison in the comparator 322. The afore-mentioned A/D conversion, comparison and sending out of the result of the comparison are carried out in the period of timing pulses applied on the terminal 314. Reference numeral 324 designates an iris drive circuit for opening/closing the iris 301 based on the high- or low-level voltage sent out from the terminal 313. Reference numeral 325 designates a processing mode change-over switch which receives, through the terminal 316, an instruction related to the AE mode designated by the user, and changes the processing mode in the microcomputer. Reference numeral 326 designates an exposure time controller which gives an instruction related to exposure period of time or shutter speed to the image pickup device driving circuit 306.

In the following, the operation of the respective parts is described based on the signal flow.

Both mode setting and shutter speed and iris value setting are necessary for the operation. For example, the settings are carried out by connecting two switches (not shown) to the terminal 316.

When, for example, three modes of ordinary AE, manual-shutter speed mode AE, manual-iris mode AE can be carried out, these AE modes are selected successively based on a signal obtained from one of the switches connected to the terminal 316. "Ordinary AE" herein used is equivalent to exposure control in a home video camera having no electronic shutter function. For example, this is equal to manual-shutter speed mode AE of 1/60 sec in an NTSC signal method image pickup apparatus. In the manual-shutter speed mode AE mode, the shutter speed is selected through the other switch connected to the terminal 316. For example, the shutter speed is selected in the order of 1/60 sec, 1/100 sec, 1/250 sec and 1/500 sec. In the manual-iris mode AE mode, iris values of, for example, F1.2, F2, F2.8 and F4, are selected successively through the switch.

In the case where the ordinary mode or manual shutter speed mode AE mode is designated by the user, the exposure time control circuit 126 issues an instruction for the image pickup device driving circuit 306 to fix the exposure period of time of the image pickup device to 1/60 sec or a value designated by the user and neglects the output of the comparator 309.

Assuming now that initial data A is stored in the up-down counter 320, the iris value takes a value of A because the iris is controlled by a loop constituted by 324-302-303-304-321-322-323 so as to be closed when the iris value data in 321 is more than A, in other words, when the iris is opened and, on the other hand, so as to be opened when the iris value data is less than A.

Of course, a detection voltage obtained from the detection circuit 308 in the aforementioned condition takes a value corresponding to the iris value A. Through comparison between the detection voltage and the reference voltage 310, the data of the up-down counter 320 is rewritten. Assuming now that the data in the counter is rewritten from A to B, the iris is controlled again so that the data in 321 becomes substantially equal to B. As a result, the iris value is controlled so that the output voltage of the detection circuit 308 becomes substantially equal to the reference voltage 310, and, then, automatic exposure is carried out at a shutter speed designated by the user. Accordingly, manual-shutter speed mode AE is attained. FIG. 32 is a flow chart of the aforementioned procedure.

The manual iris mode AE mode is designated by the user is described as follows. In this case, the data of the up-down counter 320 is fixed to a data C corresponding to an iris value designated by the user regardless of the result of the comparator 309. As a result, the iris value is fixed to a value to make the data in 312 C, that is, fixed to an iris value designated by the user.

In the aforementioned condition, the exposure time controller 326 issues an instruction to change the shutter speed based on the result of the comparator 309. As a result, the shutter speed is controlled so that the output voltage of the detection circuit 308 becomes substantially equal to the reference voltage 310. Accordingly, manual iris mode AE in the iris value designated by the user is attained.

Figure 33:
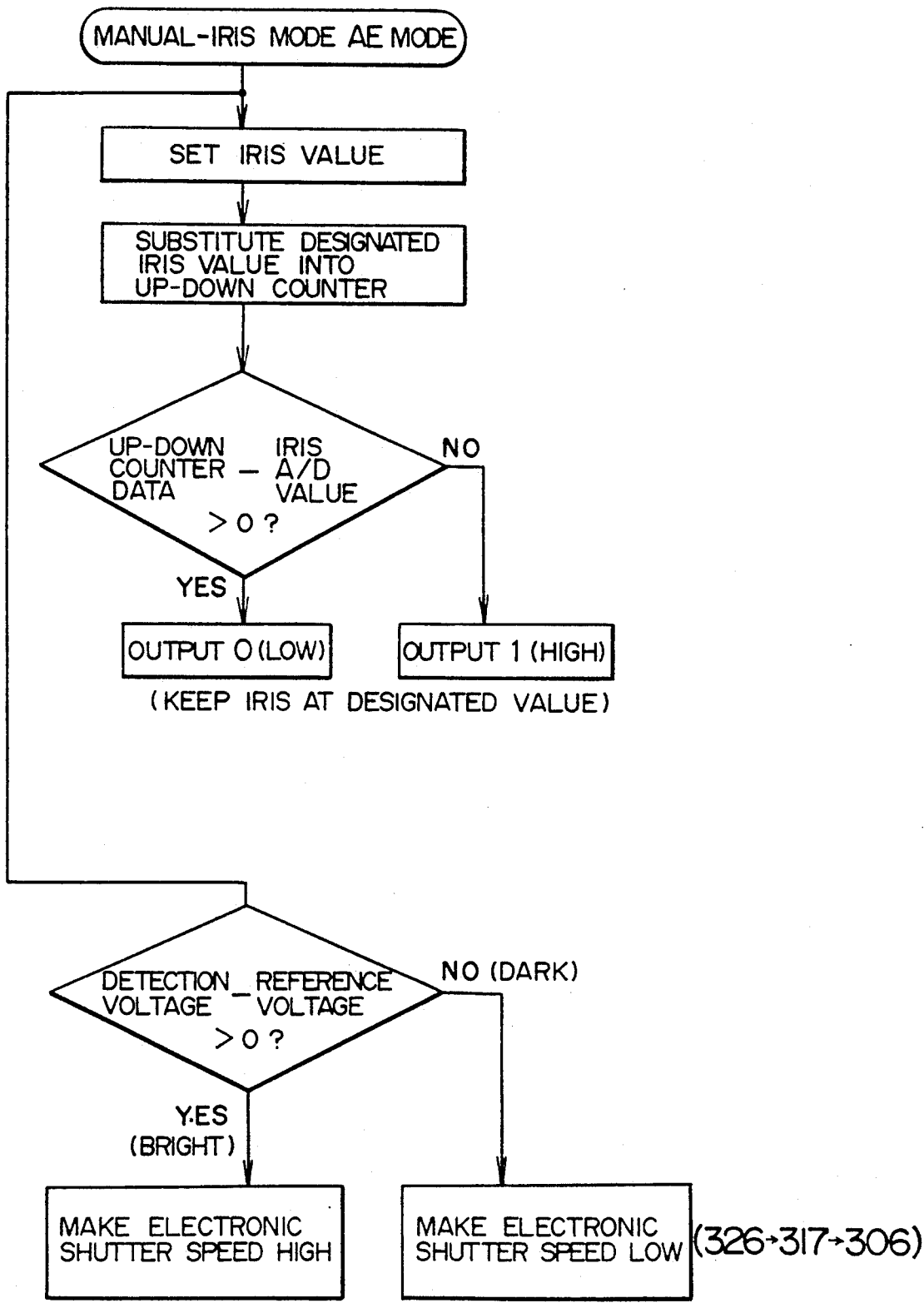

FIG. 33 is a flow chart of the aforementioned procedure.

In the following, the iris stopper is described. In the manual-iris mode AE mode, the iris value designated by the user is limited within a range, for example, about F11, in which iris related blur is not remarkable. In the ordinary mode or manual shutter speed mode AE mode, the iris value is calculated from the result of the A/D conversion of the Hall element output and fixed to F11 by changing the processing of the microcomputer to the manual iris mode AE mode when the iris value exceeds F11. That is, when the iris value exceeds F11, exposure control based on the electronic shutter is carried out while the iris value is fixed to F11. According to the aforementioned exposure control, for example, in the case where the image of a brightly illuminated subject requiring the iris value of F16 is picked up, the iris value and the electronic shutter speed become F11 and about 1/120 sec, respectively. Accordingly, there is no occurrence of iris related blur.

In the aforementioned embodiment, two loops exist. One is a small loop for feeding back the result of comparison between the actual iris value and the data in the up-down counter 320 as a target value. The other is a large loop for feeding the result of comparison back to the iris drive circuit while changing the data in the up-down counter 320 as a target iris value based on the comparison between light quantity obtained from the iris value determined by the small loop and a reference value. Feedback sampling periods are determined by timing pulses applied onto the terminals 314 and 318, respectively. In this case, it is important that the small loop control period $S_1$ is shorter than the large loop control period $S_2$, so that the actual iris value can be controlled stably in the small loop period with respect to the target iris value changed by the large loop control period. Accordingly, smooth iris driving can be made.

As described above, according to this embodiment, both a manual-iris mode AE function and an iris stopper function can be provided.

In the following, a further embodiment of the present invention is described with reference to FIG. 34. This embodiment is based on the embodiment of FIG. 31 and has improved iris response speed and stability. In this embodiment, therefore, the output voltage of the detection circuit as representing exposure light quantity is converted from an analog signal to a digital signal in the microcomputer so that the control loop feedback gain is changed corresponding to the difference between the obtained voltage and the reference voltage or the ratio of the two voltages.

Figure 34:
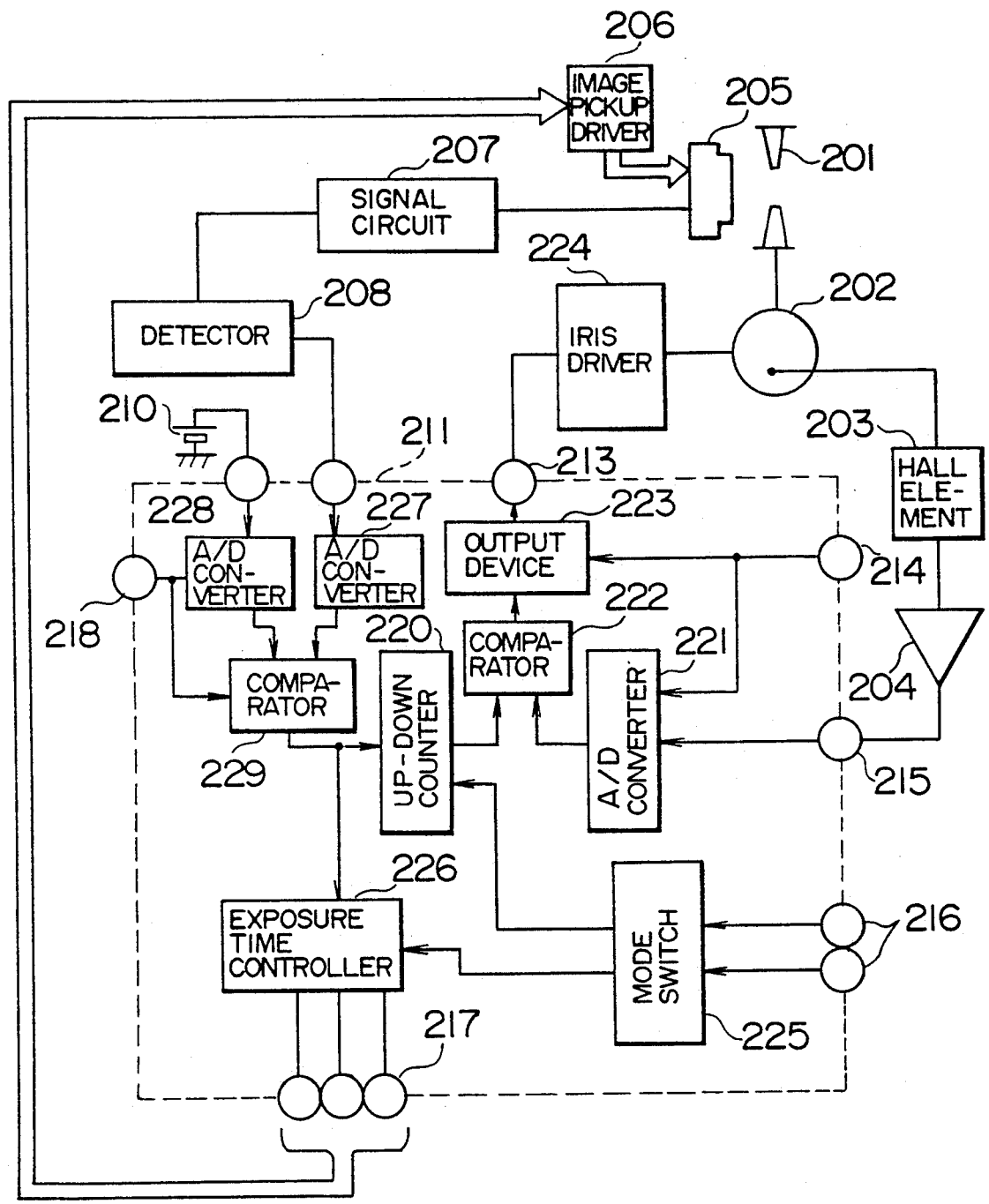
FIG. 34 is a block diagram showing a further embodiment of the image pickup apparatus according to the present invention.

Reference numerals 201 to 226 in FIG. 34 correspond to reference numerals 301 to 326 in FIG. 31, respectively. In FIG. 34 reference numeral 227 designates an A/D converter for performing A/D conversion on the detection output signal and 228 designates an A/D converter for performing A/D conversion on the reference voltage 210. Reference numeral 229 designates a comparator for comparing the results of the two A/D conversions with each other to generate the difference therebetween or the ratio thereof.

The operation of the respective parts is described in the case where a lens having a maximum aperture F value of 2 is used and intense light requiring the iris value of F16 suddenly enters into the lens with the iris almost fully opened in the ordinary mode.

In the stable condition before the entrance of intensive light, the output voltage of the detection circuit 208 is substantially equal to the reference voltage 210. Accordingly, the difference between the results of conversion of both the output and reference voltages is zero, and, in other words, the ratio therebetween is 1. At this time, the target iris value data in the up-down counter 220 is equal to the current iris value data in the A/D converter 221. Accordingly, the iris is kept in a stable state.

When intensive light now enters the lens, the output voltage of the detection circuit 208 becomes substantially different from the reference voltage. A threshold is provided in the comparator 229 in advance. When, for example, the difference is within one iris stop ($\pm 6$ dB), an instruction to shift the data of the up-down counter 220 by one bit is given. When, for example, the difference is within a range of from one to two stops ($\pm 12$ dB to $\pm 6$ dB), an instruction to shift the data by two bits is given. When, for example, the difference is more than two stops, an instruction to shift the data by 4 bits is given.

In this embodiment, therefore, the iris moves at a speed four times as high as the normal speed before the iris value reaches F8; the iris moves at a speed twice as high as the normal speed when the iris value is within a range of from F8 to F11; and the iris moves at the normal response speed and stabilized after the iris value exceeds F11.

In the manual-iris mode AE mode, the iris moves in the same manner as described above. When the output voltage of the detection circuit is largely different from the reference voltage, the quantity of change of the exposure period of time is increased. As the difference decreases, the quantity of change approaches that at the stable state.

According to the aforementioned embodiment, both the speed and stability in the automatic iris function including a manual-iris mode AE function can be attained at the same time.

A further embodiment of the present invention is described with reference to FIGS. 35 through 37. In this embodiment, the iris response speed and stability are improved on the basis of the embodiment of FIG. 31, similar to the embodiment of FIG. 34. In this embodiment, an iris judgment means is provided in the microcomputer to divide the iris value into a plurality of areas so that the control loop feedback gain in each area is changed.

In the case where the iris is controlled based on digital data, the reciprocating motion of the data within a range of $\pm 1$ LSB is repeated in every control period in the stable state. It is, therefore, necessary that the A/D conversion bit number is a bit number enough to make the change of light quantity caused by the $\pm 1$ LSB reciprocating motion not more than the detection limit.

Figure 35:
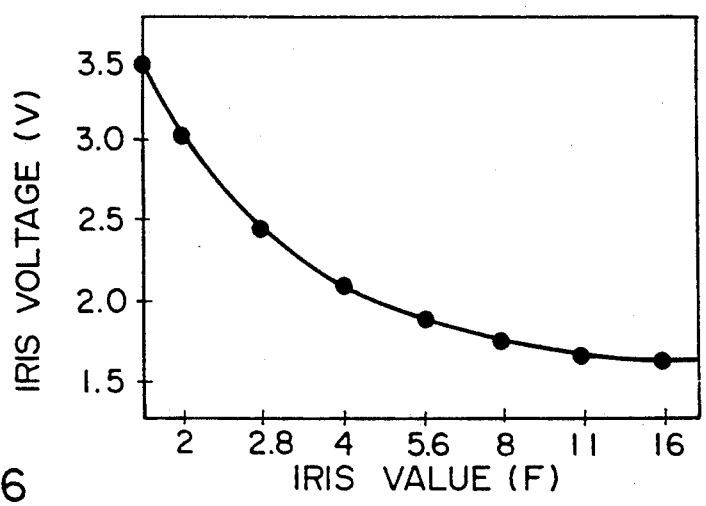
FIG. 35 is a graph showing the relationship between the output voltage of an iris position detecting element and the iris value.

FIG. 35 shows dependency of the Hall element amplifier output voltage on the iris value. As the iris is reduced, the output voltage change decreases relative to the iris value change. Accordingly, in the case where the iris is controlled continuously based on the comparison between the current iris value and the target iris value as in the present invention, it is necessary to determine a quantization bit number from the slope of the Hall voltage with respect to the light quantity change in the condition in which the iris is reduced to the minimum value in the iris control range of the image pickup apparatus. When an iris stopper as shown in the embodiment of FIG. 31 is provided, a quantization bit number necessary for obtaining sufficient resolution power in an iris value related to the stopper must be determined.

In the case where the iris is controlled based on the thus determined quantization bit number, redundant bits occur when the iris is opened to F2 or F2.8 so that the iris response becomes very slow though the data change by one LSB is repeated in one control procedure.

In this embodiment, therefore, the quantity of change of the target iris value in one control procedure is changed based on the current value by using the areas set in the iris judgment means provided in the microcomputer to thereby change the data in the up-down counter 420 in such a manner as follows. When, for example, the iris value is within a range of from the maximum aperture state to F2.8, the third lowest bit of the data in the up-down counter 420 is changed. When, for example, the iris value is within a range of from F2.8 to F5.6, the second lowest bit of the data in the up-down counter 420 is changed. When, for example, the iris value is F5.6 or more, the lowest bit of the data in the up-down counter 420 is changed. Alternatively, the data in the up-down counter may be shifted by the bit number equal to the value designated by the respective area in the condition that the value of the respective area is determined in advance in such a manner as follows. A value of 4 is given to the area in the range of from the maximum aperture of F2.8; a value of 3 is given to the area in the range of from F2.8 to F5.6; a value of 2 is given to the area in the range of F5.6 to F8; and a value of 1 is given to the area in the range of from F8 to F16.

Accordingly, both the speed and stability in iris response can be attained at the same time.

Figure 36:
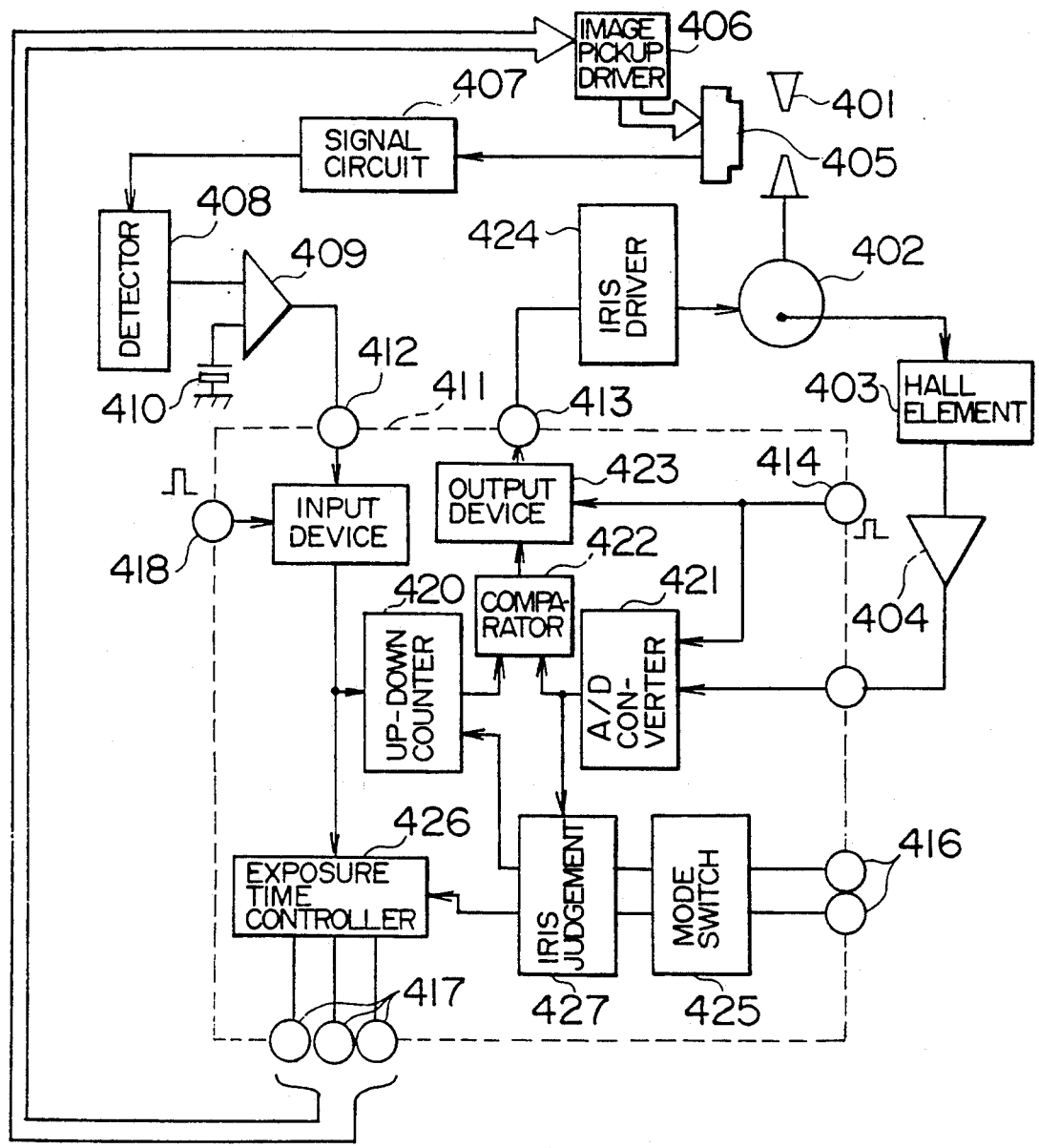
FIG. 36 is a block diagram showing a further embodiment of the image pickup apparatus according to the present invention.

Reference nuemrals 401 to 425 in FIG. 36 correspond to reference numerals 301 to 325 in FIG. 31, and the operation of those parts designated by reference numerals 401 to 425 are the same as that of those designated by those corresponding reference numerals 301 to 325, respectively. In FIG. 36 reference numeral 427 designates an iris value judgment means in which the quantity of change obtained by the up-down counter 420 and the exposure time control circuit 426 in one control procedure is changed corresponding to the iris condition.

Figure 37:
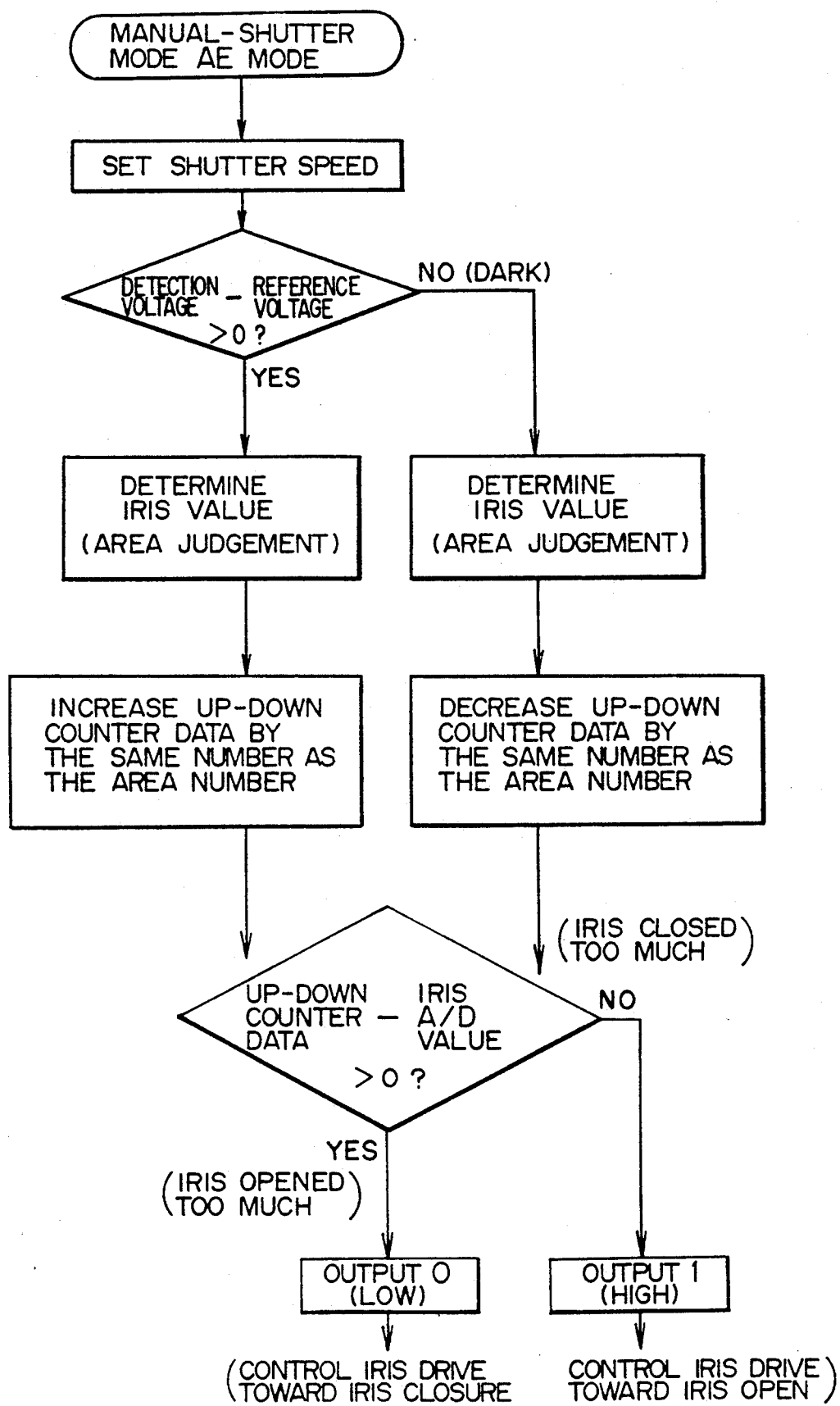
FIG. 37 is a flow chart showing the operation of the image pickup apparatus in this embodiment.

FIG. 37 is a flow chart showing the control in this embodiment.

With a combination of the preceeding embodiment and the embodiment of FIG. 34, higher speed can be attained. Although this embodiment utilizes a software controlled microcomputer the same effect is attained in the case where a non-linear characteristic may be given to the amplifier 404 of the Hall element output so that the change of the output voltage of the amplifier with respect to the change of light quantity is kept constant in every iris value with no use of the microcomputer.

In the following, a further embodiment of the present invention is described with reference to FIG. 38. This embodiment is based on the embodiment of FIG. 31 and provides improvement in both iris response speed and stability similarly to the embodiments of FIGS. 34 and 36. In this embodiment, therefore, the output signal from the output device 323 in FIG. 31 is sent out in the form of a pulse signal having a duty factor which is changed corresponding to the iris opening or closing instruction. One example of the operation is shown in FIG. 37.

In FIG. 38, the diagram (a) is a timing chart showing the data in the up-down counter 320 in FIG. 31, that is, the change of the target iris value, the diagram (b) shows the change of the output pulse signal corresponding to the change shown in the diagram (a), and the diagram (c) shows the change of the actual iris value.

In FIG. 38, the iris value coincides with the target iris value during the period between $T_0$ and $T_1$. During the period, pulses of a 50% duty factor are generated from the output terminal 313 in FIG. 31. When the target iris value is changed at time $T_1$, the output pulse duty factor is changed. In this embodiment, a pulse of a 100% duty factor or a high-level voltage is generated. When the difference between the actual iris value and the target iris value or the ratio therebetween falls within a predetermined range at time $T_2$, the duty factor of the output pulse is changed again. In this embodiment, the duty factor becomes 75%. When the actual iris value coincides with the target iris value at time $T_3$, the duty factor becomes 50% again. When the target value is moved in reverse in the period between $T_3$ and $T_6$, the output pulse duty factor is changed in the sequence of 50%—0%—25%—50%.

According to this embodiment, both the response smoothness and stability can be improved compared with the output method in which high-level and low-level signals are alternated easily with respect to the relationship between the actual iris value and the target iris value.

An image pickup apparatus is greatly improved in both the response smoothness and stability by combination of two or more embodiments as shown in FIGS. 34, 36 and 38.

In the following, a further embodiment of the present invention is described with reference to FIG. 39. This embodiment is related to the handling property of the image pickup apparatus constructed according to the present invention.

Assuming now that the range of light intensity in a general camera is from 100 lux to 100,000 lux, an iris control range of F1.2 to F36 and an exposure time control range of 1/60 sec to 1/60,000 sec must be provided to perfectly realize both the manual-iris mode AE and manual-shutter speed mode AE in the case of use of a lens of the maximum aperture F1.2. However, this is difficult to achieve from the point of view of accuracy. In particular, the electronic shutter determining the exposure period of time can be, in most cases, changed only in an increment or decrement of a predetermined period such as a horizontal scanning period because of structure of the image pick device, limitation by the control circuit, and the like. In this case, there is a predetermined limitation in the exposure period of time which can be controlled. This embodiment is related to a measure as an image pickup apparatus which handles the case where a necessary exposure time control range cannot be maintained.

Figures 38A, 38B, 38C, 39:
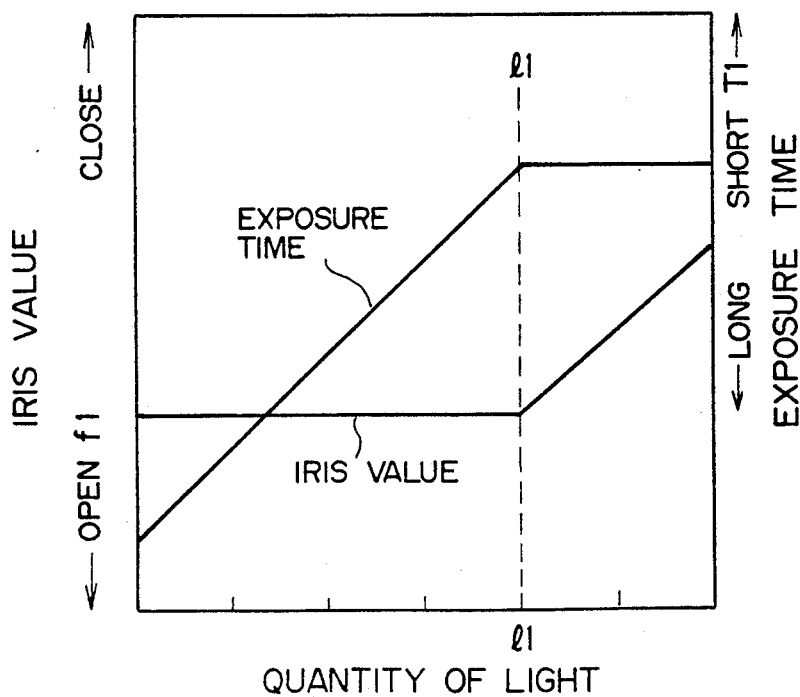
FIGS. 38A–38C are a block diagram showing a further embodiment of the image pickup apparatus according to the present invention.
FIG. 39 is a graph showing an example of the light intensity dependency of the iris value and exposure period of time in a further embodiment of the image pickup apparatus according to the present invention.

FIG. 39 shows the change of the iris value and the change of the exposure period of time caused by the light quantity in the case where the user selects the manual-iris mode AE mode and designates the iris value of F1. As the light quantity increases, the exposure period of time decreases. When the exposure period of time must exceed the time $T_1$ limited as the control range for the aforementioned reasons, or in other words, when the light quantity exceeds $l_1$, the control mode is switched to the manual-shutter mode AE mode after the exposure period of time is forcedly fixed to $T_1$. By the aforementioned method, areas in which exposure control cannot be made in the manual-iris mode can be eliminated. The aforementioned mode switching may be indicated, for exaple, in a finder.

Methods for providing the aforementioned various controlling means in the image pickup apparatus are as follows. Although the control means can be constructed in the form of an analog circuit, it is necessary to store information such as a current iris value, a desired iris value, a current exposure light quantity, a desired exposure light quantity, and the like, and perform various calculations based on the information. The objects to be controlled are the iris value and the exposure period of time of the image pickup device, and, at the same time, the processing speed is low and takes a value of the order of kHz. From the point of view of popularization of microcomputer including A/D converters, the system using such a microcomputer is advantageous in cost and the quantity of data processing.

According to the present invention, the iris value can be maintained to attain manual iris mode AE and, accordingly, the user can select depth of field. Further, an iris stopper can be provided to sufficiently prevent iris related blur. Further, the exposure period of time is adjusted finely when the exposure period of time is controlled in an increment/decrement finer than 1H.

We claim:

1. An exposure control method in a video movie camera having an iris of feedback controlled type, comprising:
    generating a desired iris value specified by a user;
    detecting a current iris value of said iris during sensing of an image by said video movie camera;
    comparing said current iris value with said desired iris value during sensing of the image; and
    controlling said iris based on a result of a comparison of said current iris value and said desired value to cause the iris value to be substantially equal to said desired iris value during sensing of the image by said video camera.

2. An exposure control method for a video movie camera having a changeable exposure start time which is changeable in increments or decrements of one horizontal scanning period and a changeable exposure end time which is changeable in increments or decrements of shorter than one horizontal scanning period comprising:
    determining if a quantity of light for exposure is within a proper range; and
    changing the exposure start time of said video movie camera in an increment or decrement of one horizontal scanning period and or changing the exposure end time of said video movie camera in an increment or decrement shorter than one horizontal scanning period when the quantity of light is outside of said proper range and then determining if the quantity of light for exposure is within the proper range.

3. A video movie camera comprising:
    a lens and an iris of feedback controlled type which is driven to provide a continuous iris value during sensing of an image by the video camera;
    means for generating a desired iris value specified by a user;
    means for generating another desired iris value in accordance with a quantity of light for exposure;
    means for detecting a current iris value during sensing of an image by the video camera;
    comparing means for comparing the current iris value with said desired iris value when the video camera is in a manual mode and with said another desired iris value when the video camera is in an automatic mode, during sensing of the image by the video camera;
    means for driving said iris based on a result of said comparison to cause the iris value to be substantially equal to one of said desired iris value and said another desired value during the sensing of the image by said video camera;
    means for controlling said means for driving while limiting the iris value of said iris to not exceed a predetermined value at least in the automatic mode; and
    means for controlling the level of an output signal by an image pickup device of the movie camera by automatically adjusting an exposure period of time and or gain of an amplifier for amplifying said output signal.

4. An exposure control method of controlling an iris of feedback controlled type:
    generating a desired iris value specified by a user;
    generating another desired iris value in accordance with a quantity of light for exposure;
    detecting a current iris value during sensing of an image by a video camera;
    comparing said current iris value with said desired iris value when the camera is in a manual mode and with said another desired iris value when the video camera is in an automatic mode, during the sensing of the image;
    changing said iris based on a result of the comparison of the current iris value and one of the desired iris value and the another desired value during the sensing of the image; and
    limiting said desired iris value to not exceed a predetermined value at least in the automatic mode;

5. An exposure control method of a video moving camera comprising:
    controlling an iris of said video movie camera during sensing of an image, said iris being of feedback controlled type;
    controlling an exposure period of time and wherein controlling the iris includes;
    generating a desired iris value specified by a user;
    detecting a current iris value of said iris during sensing of the image;
    comparing said current iris value with said desired iris value during sensing of the image; and
    controlling said iris based on a result of the comparing said current iris value with said desired iris value to maintain the iris value at said desired iris value.

6. An exposure control method according to claim 5 in which said controlling of the exposure period of time includes:
    comparing a level of an output signal of an image pickup device of said video movie camera with a level of a reference signal; and
    changing said exposure period of time based on a result of said comparison to reduce an error represented by the result of said comparison to substantially zero.

7. An exposure control method according to claim 6 in which said changing said exposure period of time includes:
    changing an exposure start time of said image pickup apparatus of said video movie camera in an increment or decrement of one horizontal scanning period and changing an exposure end time of said image pickup apparatus of said video movie camera in an increment or decrement shorter than one horizontal scanning period.

8. An exposure control method according to claim 6, further comprising:
amplifying an output of said image pickup device with a variable gain to produce a predetermined output level of said image pickup device with said changing of exposure period of time including changing the exposure period of time of said image pickup device substantially in an increment or decrement of one horizontal scanning period.

9. An exposure control method according to claim 5 further comprising:
controlling said iris to set said iris value to not be larger than a predetermined value.

10. An exposure control method according to claim 5 further comprising:
controlling said exposure period of time to set said exposure period of time to not be shorter than a predetermined value.

11. An exposure control method according to claim 5 further comprising:
limiting said iris so that the iris value does not cause the exposure period of time to exceed a predetermined time.

12. An automatic exposure control method according to claim 11 wherein:
controlling said iris is followed by controlling an exposure start time of said video movie camera in an increment or decrement of one horizontal scanning period.

13. A video movie camera comprising:
a lens of an iris of feedback controlled type;
means for generating a desired iris value specified by a user;
means for detecting a current iris value during sensing of an image by said video camera;
means for comparing said desired iris value with said current iris value during the sensing of the image by the video camera;
means for driving said iris based on a result of a comparison by said means for comparing;
means, coupled to said means for driving, for automatically controlling said iris;
means, coupled to said means for driving, for manually controlling said iris;
an image pickup device;
means, coupled to said image pickup device, for driving said image pickup device to control an exposure period of time of said image pickup device;
means, coupled to said means for driving said image pickup device, for automatically controlling an exposure period of time;
means, coupled to said means for driving said image pickup device, for manually controlling the exposure period of time;
means for selecting control by one of said means for automatically controlling said iris and said means for manually controlling said iris; and
means for selecting control by one of said means for automatically controlling exposure period and said means for manually controlling exposure period.

14. A video movie camera in accordance with claim 13 further comprising:
control means, coupled to said means for driving said image pickup device, for controlling said means for driving said image pickup device to limit an exposure period of time manually or automatically; and
means, coupled to said control means, for limiting an iris value to not exceed a predetermined value.

15. A video movie camera in accordance with claim 14 wherein:
said control means limits an iris value to not exceed a predetermined value for limiting an exposure period of time to not be shorter than a predetermined value.

16. A video movie camera in accordance with claim 13 further comprising:
means, coupled to said means for manually controlling said iris, for setting said iris to a desired iris value in response to manual designation of a user of the video movie camera.

17. A video movie camera comprising:
a lens and an iris of feedback controlled type;
means for driving said iris;
an image pickup device;
means for driving said image pickup device;
means for generating a signal representing a current iris value during sensing of an image by said video camper;
means for generating a signal representing a desired iris value specified by a user; and
means for comparing said signal representing said current iris value with said signal representing said desired iris value to control said means for driving said iris based on a result of the comparison to maintain the iris value at said desired iris value during sensing of the image by said video camera.

18. A video movie camera according to claim 17 further comprising:
second comparison means for comparing a level of an output signal of said image pickup device with a level of a reference signal; and
an exposure period of time changing means coupled to said means of driving said image pickup device for changing an exposure start time of said image pickup device in an increment or decrement of one horizontal scanning period based on a comparison by said second comparison means to adjust the level of the output signal of said image pickup device to be substantially equal to the level of said reference signal.

19. A video movie camera according to claim 18 further comprising:
means for changing an exposure end time of said image pickup device in an increment or decrement of a period of timer shorter than one horizontal scanning period based on said comparison by second comparison means.

20. A video movie camera according to claim 18 further comprising:
a variable gain amplifier, coupled to an output of said image pickup device, for maintaining an output of said image pickup device substantially constant.

21. A video movie camera according to claim 17 further comprising:
an iris value limiting means, coupled to said means for generating a desired iris value, for limiting said current iris value to not exceed a predetermined value; and
control means, coupled to said means for driving said iris, for controlling said means for driving said iris in response to the operation of said iris value limiting means to maintain the level of the output signal of said image pickup device at a predetermined value.

22. A video movie camera according to claim 21 wherein said means for driving said image pickup device comprises:

means for detecting the output signal of said image pickup device;

means, coupled to the means for detecting, for comparing a level of the output signal with the level of a reference signal; and drive control means for controlling said means for driving said image pickup device based on a result of comparison by the means for comparing a level, said drive control means including means for changing an exposure period of time based on a result of the comparison by the means for comparing a level.

23. An exposure control system in a video movie camera comprising:

an iris;

means for generating an iris value signal representing the iris value of said iris;

conversion means for converting the iris value signal into a digital value;

storage means for storing a series of numerical values having an identical number of digits as the digital value produced by said conversion means;

means for storing at least one numerical value substantially equal to any one of the stored series of numerical values;

means for selecting any one of the stored numerical values stored in said means for storing to cause said storage means to store said selected stored numerical value into said storage means; and control means for controlling said iris so that the numerical value stored in said storage means and the digital value from said conversion means are substantially coincident with each other.

24. An exposure control system according to claim 23 further comprising:

means for generating a signal representing a quantity of exposure light;

means for generating a reference signal representing a reference quantity of exposure light;

means for comparing said signal representing said quantity of exposure light with said reference signal; and wherein said storage means includes an up-down counter having an input terminal connected to an output of said means for comparing with said up-down counter being responsive to an externally applied signal to output as the numerical value stored in said storage means a numerical value which is increased or decreased in accordance with a result of the comparison in said means for comparing.

25. An exposure control system according to claim 24 wherein:

the numerical value which can be inputted to said up-down counter is limited to prevent said value from being reduced beyond a predetermined value.

26. An exposure control system according to claim 25 wherein:

said control means includes means for generating a pulse having a duty factor which changes in accordance with one of a difference or ratio between the numerical value outputted by said up-down counter and the digital value produced by said conversion means with said iris control being based on said pulse.

27. An exposure control system in a video movie camera:

an iris;

means for generating a signal corresponding to a current iris value of said iris;

means for generating at least one signal corresponding to at least one single target iris value which can be externally selected;

means for generating a signal corresponding to a quantity of exposure light;

means for generating a signal corresponding to a reference quantity of exposure light; and an iris control means for controlling said iris, said iris control means including means for changing operation speed of said iris in accordance with at least one factor selected from one of a difference or a ratio between the current quantity of exposure light and the reference quantity of exposure light, one of a difference or a ratio between a current iris value and the target iris value, and the current iris value.

28. An image pickup apparatus comprising:

an image pickup device;

an iris;

first signal generation means for generating a current iris value signal representing a current iris value of said iris;

means for converting said signal representing the iris value into a digital value;

second signal generation means for generating a signal representing a quantity of exposure light;

drive means for driving said image pickup device to control an exposure period of time of said image pickup device;

exposure period of time control means for controlling said drive means based on an output of said second signal generation means for maintaining a quantity of exposure light at a predetermined value;

means for storing at least one numerical value substantially equal to any value which can be taken as the digital value of said iris value signal;

means for selecting one of said at least one numerical value stored in said means for storing to cause a storage means to store said selected one numerical value; and control means for controlling said iris so that the numerical value stored in said means for storing an the digital value from said means for converting are substantially coincident with each other.

29. An image pickup apparatus according to claim 28 further comprising:

means for generating a reference signal representing a reference quantity of exposure light; and means for comparing said signal representing the quantity of exposure light with said reference signal; and wherein said means for storing includes an up-down counter having an input terminal connected to an output of said means for comparing with said up-down counter being responsive to an externally applied signal to output as the numerical value stored in said means for storing a numerical value which is incremented or decremented in accordance with a result of the comparison in said means for comparing.

30. An image pickup apparatus according to claim 29 wherein:

the numerical value which can be inputted to said up-down counter is limited to prevent said numerical value from being reduced beyond a predetermined value.

31. An image pickup apparatus according to claim 29 wherein said control means includes:

means for generating a pulse having a duty factor which changes in accordance with one of a difference or ratio between the numerical value outputted from said up-down counter and the digital value produced by said means for converting with said iris control being based on said pulse.

32. A video movie camera comprising:

an image pickup device;

an iris;

means for generating a signal representing a current iris value of said iris;

means for generating a signal representing a quantity of exposure light;

drive means for driving said image pickup device to control an exposure period of time of said image pickup device;

an exposure period of time control means for controlling said drive means based on an output of said means for generating a signal representing a quantity of exposure light maintaining a quantity of exposure light at a predetermined value;

means for generating at least one signal corresponding to at least one target iris value which can be externally selected;

means for generating a signal corresponding to a reference quantity of exposure light; and an iris control means for controlling said iris, said iris control means including means for changing an operation speed of said iris in accordance with at least one factor selected from one of a difference or a ratio between the current quantity of exposure light and the reference quantity of exposure light, one of a difference or a ratio between the current iris value and the target iris value, and the current iris value.

* * * * *